United States Patent
Williams et al.

(10) Patent No.: US 9,868,211 B2
(45) Date of Patent: Jan. 16, 2018

(54) RESTRICTING MOVEMENT OF A MOBILE ROBOT

(71) Applicant: iRobot Corporation, Bedford, MA (US)

(72) Inventors: Marcus Williams, Newton, MA (US); Ping-Hong Lu, Newton, MA (US); Joseph M. Johnson, Norwood, MA (US); Fabrizio Santini, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 161 days.

(21) Appl. No.: 14/682,658

(22) Filed: Apr. 9, 2015

(65) Prior Publication Data

US 2016/0297072 A1    Oct. 13, 2016

(51) Int. Cl.
*B25J 9/16*    (2006.01)
*B25J 5/00*    (2006.01)
*G05D 1/02*    (2006.01)

(52) U.S. Cl.
CPC ............. *B25J 9/1666* (2013.01); *B25J 5/00* (2013.01); *B25J 9/1694* (2013.01); *B25J 9/1697* (2013.01); *G05D 1/0234* (2013.01); *G05D 1/0274* (2013.01); *G05D 2201/0203* (2013.01); *Y10S 901/01* (2013.01)

(58) Field of Classification Search
CPC ... B25J 9/1666; G05D 1/0212; G05D 1/0268; G05D 1/027; G05D 1/0272; G05D 1/0274; G05D 1/0276
See application file for complete search history.

(56) References Cited

U.S. PATENT DOCUMENTS

| | | |
|---|---|---|
| 4,196,727 A | 4/1980 | Verkaart et al. |
| 4,309,758 A | 1/1982 | Halsall et al. |
| 4,482,960 A | 11/1984 | Pryor |
| 4,662,854 A | 5/1987 | Fang |
| 4,679,152 A | 7/1987 | Perdue |
| 4,700,301 A | 10/1987 | Dyke |
| 4,700,427 A | 10/1987 | Knepper |
| 4,811,228 A | 3/1989 | Hyyppa |
| 4,854,006 A | 8/1989 | Nishimura et al. |
| 4,933,864 A | 6/1990 | Evans et al. |
| 5,032,775 A | 7/1991 | Mizuno et al. |
| 5,109,566 A | 5/1992 | Kobayashi et al. |
| 5,307,273 A | 4/1994 | Oh et al. |
| 5,440,216 A | 8/1995 | Kim |

(Continued)

OTHER PUBLICATIONS

European Search Report issued in European Application No. 15195596.0 dated Aug. 5, 2016, 4 pages.

(Continued)

*Primary Examiner* — Adam R Mott
(74) *Attorney, Agent, or Firm* — Fish & Richardson P.C.

(57) ABSTRACT

A robot includes a body that is movable relative to a surface one or more measurement devices within the body to output information based on an orientation of the body at an initial location on the surface, and a controller within the body to determine an orientation of the body based on the information and to restrict movement of the body to an area by preventing movement of the body beyond a barrier that is based on the orientation of the body and the initial location.

28 Claims, 18 Drawing Sheets

(56) References Cited

U.S. PATENT DOCUMENTS

| | | |
|---|---|---|
| 5,467,273 A | 11/1995 | Faibish et al. |
| 5,471,391 A | 11/1995 | Gudat et al. |
| 5,534,762 A | 7/1996 | Kim |
| 5,819,008 A | 10/1998 | Asama et al. |
| 5,903,124 A | 5/1999 | Kawakami |
| 5,974,348 A | 10/1999 | Rocks |
| 5,995,884 A | 11/1999 | Allen et al. |
| 6,108,076 A | 8/2000 | Hanseder |
| 6,112,143 A | 8/2000 | Allen et al. |
| 6,259,979 B1 | 7/2001 | Holmquist |
| 6,300,737 B1 | 10/2001 | Bergvall et al. |
| 6,389,329 B1 | 5/2002 | Colens |
| 6,442,476 B1 | 8/2002 | Poropat |
| 6,459,955 B1 | 10/2002 | Bartsch et al. |
| 6,481,515 B1 | 11/2002 | Kirkpatrick et al. |
| 6,532,404 B2 | 3/2003 | Colens |
| 6,594,844 B2 | 7/2003 | Jones |
| 6,604,021 B2 | 8/2003 | IMai et al. |
| 6,615,108 B1 | 9/2003 | Peless et al. |
| 6,658,354 B2 | 12/2003 | Lin |
| 6,690,134 B1 | 2/2004 | Jones et al. |
| 6,748,297 B2 | 6/2004 | Song et al. |
| 6,760,647 B2 | 7/2004 | Nourbakhsh et al. |
| 6,774,596 B1 | 8/2004 | Bisset |
| 6,781,338 B2 | 8/2004 | Jones et al. |
| 6,809,490 B2 | 10/2004 | Jones et al. |
| 6,883,201 B2 | 4/2005 | Jones et al. |
| 6,965,209 B2 | 11/2005 | Jones et al. |
| 7,024,278 B2 | 4/2006 | Chiappetta et al. |
| 7,155,308 B2 | 12/2006 | Jones |
| 7,173,391 B2 | 2/2007 | Jones et al. |
| 7,188,000 B2 | 3/2007 | Chiappetta et al. |
| 7,196,487 B2 | 3/2007 | Jones et al. |
| 7,388,343 B2 | 6/2008 | Jones et al. |
| 7,389,156 B2 | 6/2008 | Ziegler et al. |
| 7,430,455 B2 | 9/2008 | Casey et al. |
| 7,448,113 B2 | 11/2008 | Jones et al. |
| 7,571,511 B2 | 8/2009 | Jones et al. |
| 7,636,982 B2 | 12/2009 | Jones et al. |
| 7,761,954 B2 | 7/2010 | Ziegler et al. |
| 8,364,309 B1 | 1/2013 | Bailey |
| 8,368,339 B2 | 2/2013 | Jones et al. |
| 8,515,578 B2 | 8/2013 | Chiappetta et al. |
| 8,659,255 B2 | 2/2014 | Jones et al. |
| 8,680,816 B2 | 3/2014 | Li |
| 8,686,679 B2 | 4/2014 | Jones et al. |
| 8,793,020 B2 | 7/2014 | Chiappetta et al. |
| 2001/0021882 A1 | 9/2001 | Hosonuma et al. |
| 2002/0016649 A1 | 2/2002 | Jones |
| 2002/0120364 A1 | 8/2002 | Colens |
| 2003/0025472 A1 | 2/2003 | Jones et al. |
| 2004/0020000 A1 | 2/2004 | Jones |
| 2004/0049877 A1 | 3/2004 | Jones et al. |
| 2004/0085037 A1* | 5/2004 | Jones .................... A47L 9/009 318/567 |
| 2004/0111184 A1 | 6/2004 | Chiappetta et al. |
| 2004/0156541 A1 | 8/2004 | Jeon et al. |
| 2004/0187249 A1 | 9/2004 | Jones et al. |
| 2004/0187457 A1 | 9/2004 | Colens |
| 2004/0204792 A1 | 10/2004 | Taylor et al. |
| 2004/0207355 A1 | 10/2004 | Jones et al. |
| 2005/0067994 A1 | 3/2005 | Jones et al. |
| 2005/0204717 A1 | 9/2005 | Colens |
| 2006/0020369 A1 | 1/2006 | Taylor et al. |
| 2006/0048797 A1 | 3/2006 | Jung et al. |
| 2006/0259194 A1 | 11/2006 | Chiu |
| 2007/0179670 A1 | 8/2007 | Chiappetta et al. |
| 2007/0250212 A1 | 10/2007 | Halloran et al. |
| 2007/0266508 A1 | 11/2007 | Jones et al. |
| 2008/0039974 A1 | 2/2008 | Sandin et al. |
| 2008/0140255 A1 | 6/2008 | Ziegler et al. |
| 2008/0155768 A1 | 7/2008 | Ziegler et al. |
| 2008/0276407 A1* | 11/2008 | Schnittman ............ A47L 11/34 15/319 |
| 2008/0307590 A1 | 12/2008 | Jones et al. |
| 2010/0049365 A1 | 2/2010 | Jones et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0312429 A1 | 12/2010 | Jones et al. |
| 2011/0167574 A1* | 7/2011 | Stout .................... G05D 1/0219 15/3 |
| 2011/0202175 A1* | 8/2011 | Romanov ........... A47L 11/4011 700/250 |
| 2011/0264305 A1 | 10/2011 | Choe et al. |
| 2012/0259465 A1 | 10/2012 | Chen et al. |
| 2012/0265391 A1* | 10/2012 | Letsky ................. A01D 34/008 701/25 |
| 2012/0322023 A1 | 12/2012 | Hohlbein et al. |
| 2013/0261867 A1 | 10/2013 | Burnett et al. |
| 2014/0185941 A1 | 7/2014 | Li et al. |

OTHER PUBLICATIONS

International Search Report and Written Opinion in International Application No. PCT/US15/61283, dated Feb. 5, 2016, 12 pages.
Jarosiewicz et al., "Final Report—Lucid," University of Florida, Department of Electrical and Computer Engineering, EEL 5666—Intelligent Machine Design Laboratory, 50 pages, Aug. 1999.
International Preliminary Report on Patentability in International Application No. PCT/US2015/061283, dated Oct. 19, 2017, 10 pages.

* cited by examiner

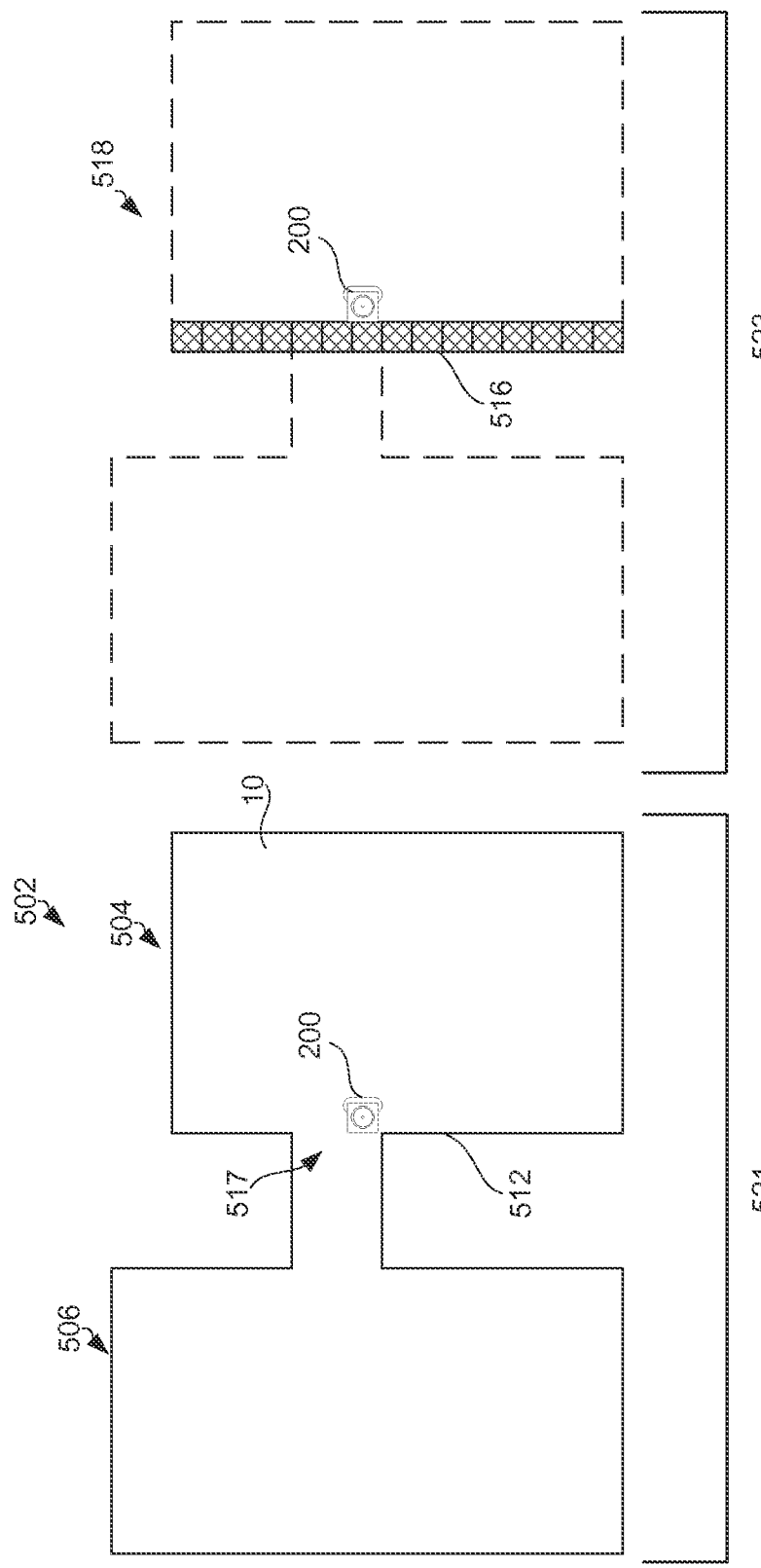

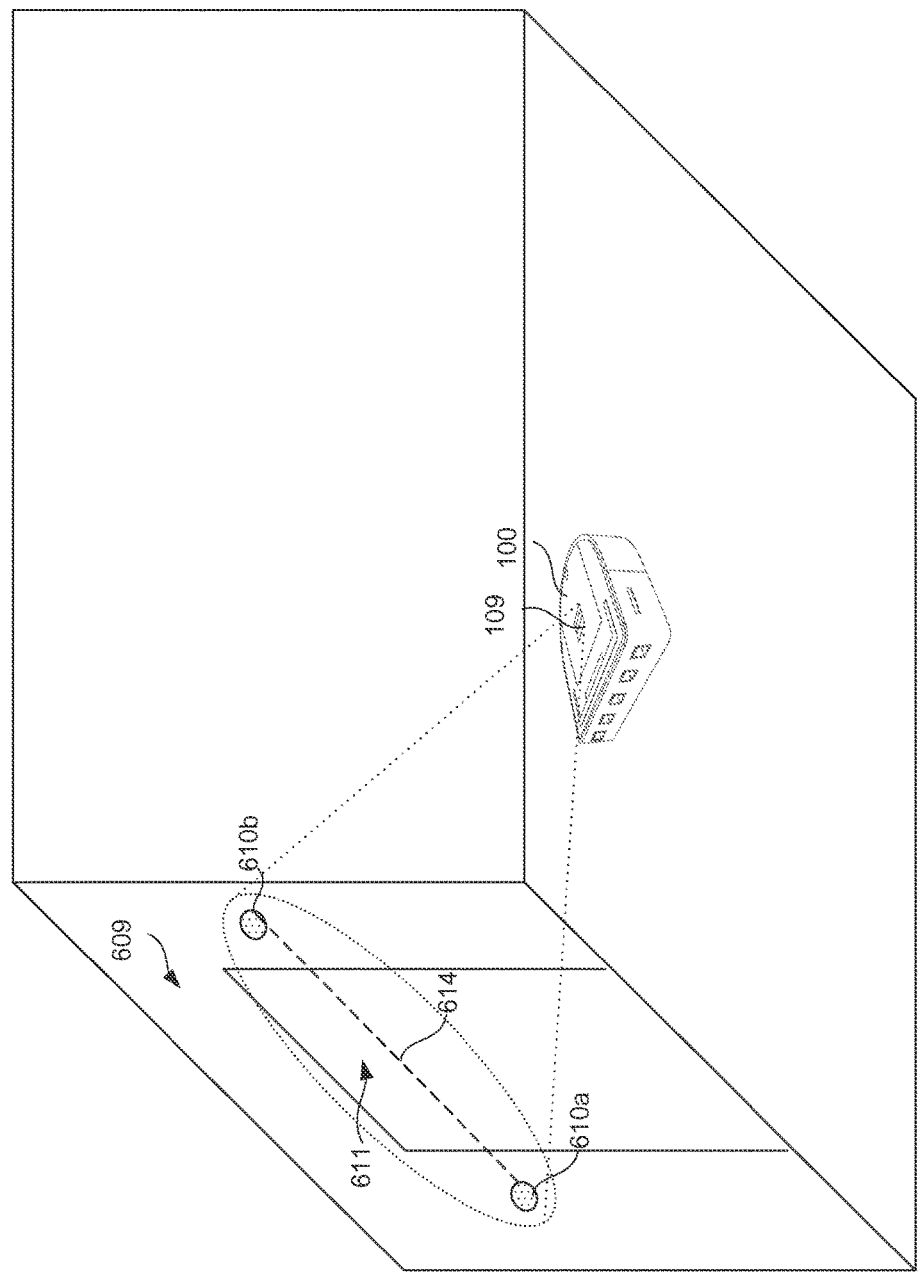

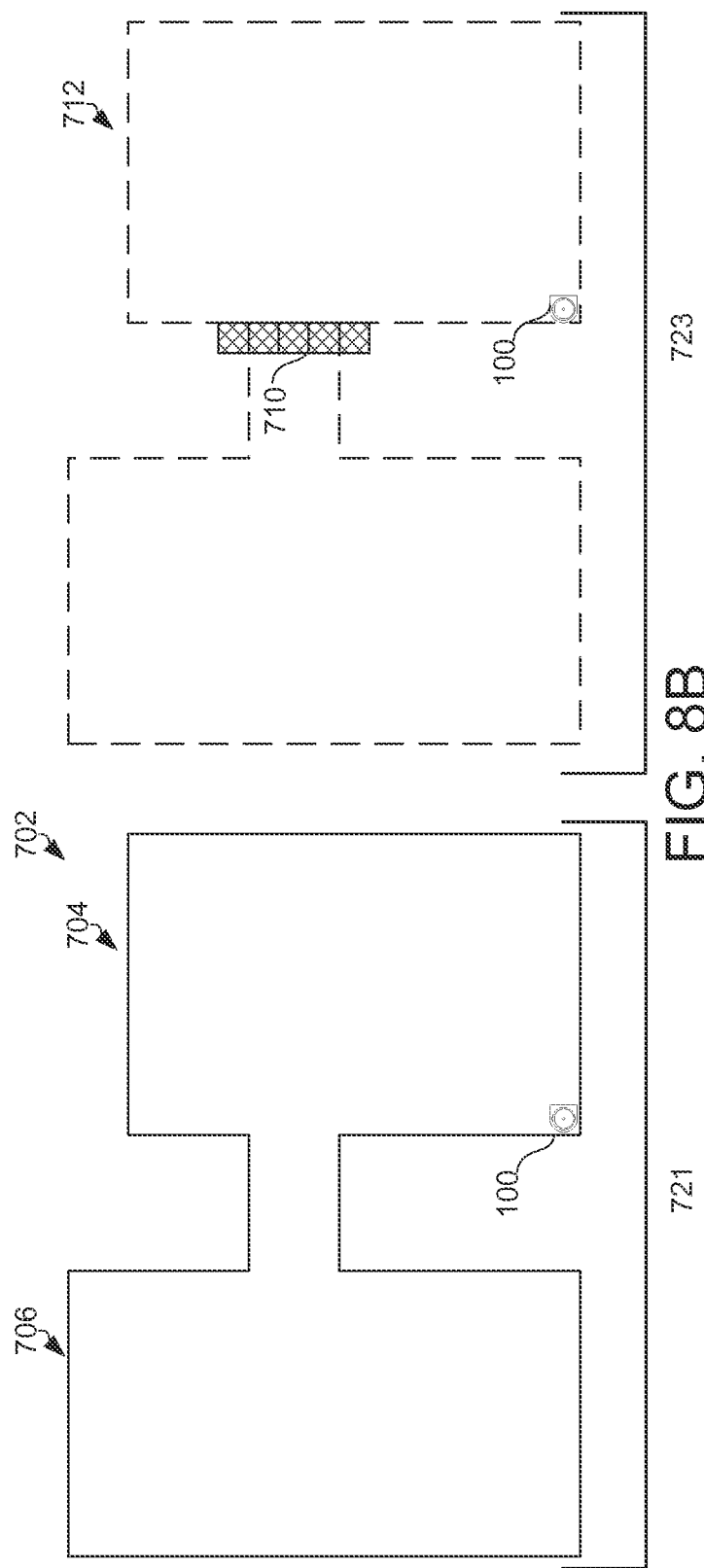

RESTRICTING MOVEMENT OF A MOBILE ROBOT

TECHNICAL FIELD

This specification relates generally to restricting movement of a mobile robot.

BACKGROUND

A mobile robot can maneuver around surfaces defined by objects, obstacles, walls, and other structures in its surroundings. In some cases, it may be desirable to restrict movement of the robot to particular regions of its surroundings. To do this, barriers can be erected to prevent the robot from passing into restricted regions. For example, a beacon that is detectable by the robot can be placed in the environment to restrict the robot from entering the restricted regions.

SUMMARY

An example robot can identify areas of an environment that are non-traversable even though a structural boundary, such as a wall, obstacle, or other surface, does not exist to prevent entrance into those areas. The robot can generate a virtual barrier to prevent movement into those areas. Various techniques are described herein for generating such a virtual barrier.

An example robot includes a body that is movable relative to a surface, one or more measurement devices within the body to output information based on an orientation of the body at an initial location on the surface, and a controller within the body to determine an orientation of the body based on the information and to restrict movement of the body to an area by preventing movement of the body beyond a barrier that is based on the orientation of the body and the initial location. The example robot may include one or more of the following features, either alone or in combination.

The barrier can extend through a doorway, and the initial position of the robot can be within the doorway. The body can include a front and a back. The barrier can extend along a line that is parallel to the back of the robot. The line can be tangential to the back of the robot. The line can intersect the body of the robot at a location indicated by a visual indicator on the robot. The barrier can include a first line that extends parallel to the back of the robot and a second line that extends perpendicular to the back of the robot. The initial location of the robot can place the back of the body adjacent to the first line and a side of the body adjacent to the second line. The controller can be programmed to restrict movement of the body by controlling the body to perform operations including rotating at an angle relative to the initial orientation, and traversing the area of the surface along paths that are substantially parallel to the barrier.

The controller can be programmed to restrict movement of the body by performing operations including generating a map that represents an area to be cleaned and designating a virtual barrier on the map that can indicate a location that the robot is prohibited from crossing. The barrier can be designated by designating coordinates corresponding to the barrier as non-traversable.

The operations of determining the orientation and restricting the movement can be performed upon entry into a handshake mode. The controller can be programmed to recognize the handshake mode in response to one or more user-initiated operations on the robot.

Another example robot includes a body that is movable along a surface below the body, a camera that faces upward relative to the surface, where the camera is configured to capture one or more images of markers fixed to a structure, and a controller within the body to identify locations of the markers based on the one or more images, and to prevent movement of the body to an area of the surface that is beyond a barrier defined by the locations of the markers at least until one or more conditions is met. The example robot may include one or more of the following features, either alone or in combination.

The markers can include infrared image markers, and the camera may be an infrared camera. The markers can include machine-readable information representing a name of a location corresponding to the structure, a name of the structure, or a both the name of the location corresponding to the structure and the name of the structure. At least one of the name of the location and the name of the structure can be transmitted to and displayed on a mobile device.

The controller can be programmed to perform operations including generating a map that represents at least part of the surface, identifying the markers on the map based on the locations of the markers, storing the map in computer memory, and storing, in computer memory, data indicating to prohibit movement of the body to the area of the surface that is beyond the locations of the markers on the map. The controller can be programmed to identify locations of the markers based on more than one image of the markers, and to prevent movement of the body to the area of the surface that is beyond the locations of the markers as identified based on the more than one image. The controller can be programmed to, upon satisfaction of the one or more conditions, permit movement of the body to the area of the surface that is beyond the barrier defined by the locations of the image markers and to prevent movement of the body back across the barrier at least until one or more conditions is met.

The robot can include a transmitter to communicate with a computer network wirelessly to send the map over the computer network to one or more remote computing devices. The one or more conditions can include the robot traversing at least a percentage of an area of the surface that is within the barrier. The one or more conditions can include the robot traversing, two or more times, at least a percentage of an area of the surface that is within the barrier.

An example method of generating an occupancy grid of at least part of an environment that is traversable by a robot includes determining, by a controller within the robot, a location and orientation of the robot within the environment, and populating, by the controller, the occupancy grid with a barrier of non-traversable cells. The barrier of non-traversable cells is based at least on the location and the orientation of the robot.

Another example method of generating an occupancy grid for a robot in an environment includes detecting, by a camera of the robot, one or more features of one or more removable markers on one or more structures in the environment, and indicating, by a controller on the robot, on the occupancy grid that a line of cells is non-traversable based on the one or more features. The example method may include one or more of the following features, either alone or in combination.

The method can include generating one or more images of the one or more features, applying an affine transformation to the one or more images to produce one or more transformed images, and confirming that the one or more transformed images sufficiently match one or more stored images. Indicating on the occupancy grid can be performed in response to confirming that the one or more transformed images sufficiently match the one or more stored images.

Advantages of the foregoing may include, but are not limited to, the following. The user can control the robot and the areas through which the robot navigates. The robot can be restricted to areas where the robot can move freely while reducing the risk of damage to objects in the area. In some implementations, the robot functions autonomously and the user does not need to monitor the robot as it covers a room in order to keep the robot out of particular areas of the room.

Any two or more of the features described in this specification, including in this summary section, can be combined to form implementations not specifically described herein.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

The details of one or more implementations are set forth in the accompanying drawings and the description herein. Other features and advantages will be apparent from the description and drawings, and from the claims.

DESCRIPTION OF THE DRAWINGS

FIGS. 6A to 6C include illustrations and a flowchart showing another process by which a mobile robot creates an invisible or virtual barrier for the robot.
FIGS. 7A to 7C include illustrations and a flowchart showing another process by which a mobile robot creates an invisible or virtual barrier for the robot.
FIGS. 8A to 8C include illustrations and a flowchart showing still another process by which a mobile robot creates an invisible or virtual barrier for the robot.

Like reference numerals in different figures indicate like elements.

DETAILED DESCRIPTION

Figure 1:
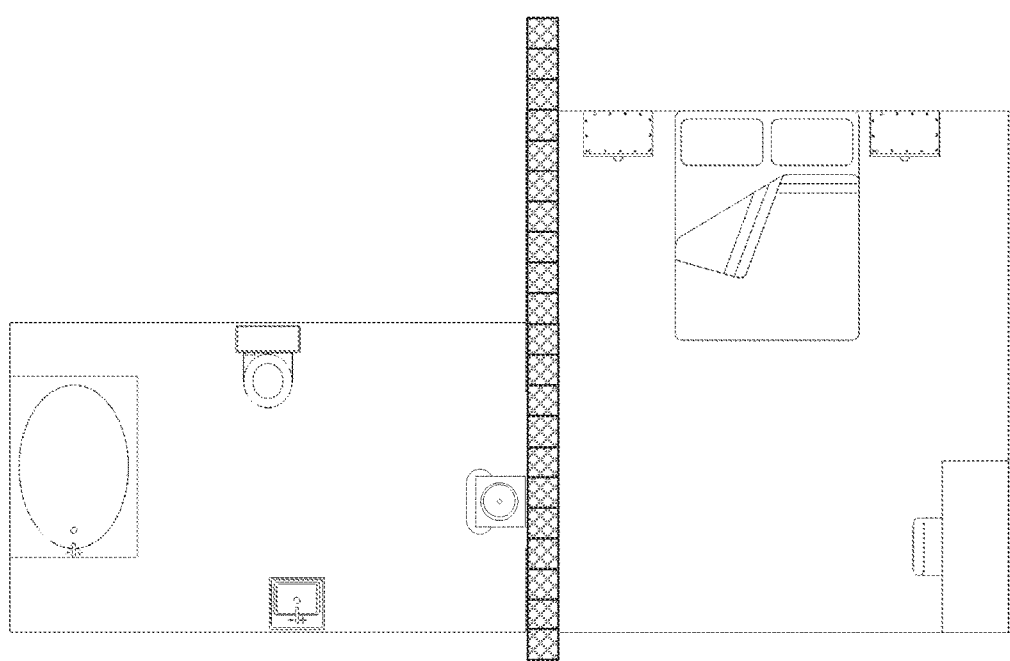
FIG. 1 shows a view of a robot in a room.

Described herein are example robots configured to traverse (or to navigate) surfaces, such as floors, carpets, turf, or other materials and perform various operations including, but not limited to, vacuuming, wet or dry cleaning, polishing, and the like. The movement of the example robots described herein may be restricted. For example, a robot may erect a virtual barrier, which defines a boundary that the robot may not cross. For example, a user can select a location for a virtual barrier to prevent the robot from entering into a particular space. As shown in FIG. 1, the robot is positioned in a bathroom and a virtual barrier is generated (shown in hashed squares) to prevent the robot from entering into the bedroom. As described herein, the virtual barrier may be created by the robot itself (e.g., based on the robot's orientation and location), or by the robot in combination with one or more elements, such as markers that are recognizable to the robot as defining a virtual barrier that the robot may not cross. The markers can be removed after the robot has initially detected the markers during an initial use. Consequently, the markers need not remain in the environment for subsequent uses of the robot.

The robot may implement other processes for creating a virtual barrier. In some implementations, the robot can record the locations of a virtual barrier on an occupancy grid that serves as a map of the robot's environment, and thereby retain in memory the locations of virtual barriers during its navigation and/or between missions. An occupancy grid can be a map of the environment as an array of cells ranging in size from 5 to 50 cm with each cell holding a probability value (e.g., a probability that the cell is occupied) or other information indicative of a status of the cell. The occupancy grid can represent a map of the environment as an evenly spaced field of binary random variables each representing the presence of an obstacle at that location in the environment. While some of the examples described herein use an occupancy grid to provide the robot with a map of the environment, other mapping techniques could be used. For example, a different map representation, such as a graph, where the virtual barrier is represented as a line segment comprised of two or more coordinates or a virtual polygon comprised of three or more coordinates or any other geometric shape or "lasso" shape could be used with the methods and systems described herein.

Virtual barriers can keep a robot from exiting or entering a particular area, e.g., to prevent a cleaning robot from moving from a bathroom area to a living room area. The virtual barriers may be temporary in that, upon satisfaction of one or more conditions, the robot may be permitted to cross the virtual barriers. For example, if a robot determines that it has cleaned the entirety of a room, the robot may then be permitted to cross a virtual barrier located across that room's exit. In this example, the robot may be prohibited from crossing back into the previously cleaned room due to the virtual barrier (unless, e.g., the robot's charging base is located in the room).

The techniques described herein may be used to restrict movement of any appropriate type of robot or other apparatus, including autonomous mobile robots that can clean a floor surface of a room by navigating about the room. An example of such a robot is floor cleaning robot 100 shown in FIG. 2A. The robot 100 includes a body 102, a forward portion 104, and a rearward portion 106. The robot 100 can move across a floor surface of a physical environment through various combinations of movements relative to three mutually perpendicular axes defined by the body 102: a transverse axis X, a fore-aft axis Y, and a central vertical axis Z. A forward drive direction along the fore-aft axis Y is designated F (referred to hereinafter as forward), and an aft drive direction along the fore-aft axis Y is designated A (referred to hereinafter as rearward). The transverse axis X extends between a right side R and a left side L of the robot 100.

A user interface 110 is located on a top portion of the body 102 and is configured to accept one or more user commands and/or display robot status. The top portion of the body 102 also may include a camera 109 that the robot 100 can use to capture images of the environment. The robot can detect features in the environment based on the images captured by the camera 109. The camera 109 can be angled upward relative to a surface supporting the robot (e.g., a floor) so that the camera 109 can capture images of wall surfaces of the environment. As described herein, in some implementations, the camera 109 can detect user-positionable and removable barrier identification markers, such as stickers or other visual identification devices on wall (or other) surfaces of the environment, and based on these barrier identification markers, generate virtual boundaries that the robot 100 is instructed not to cross.

A wall following sensor 113 on the right side of the robot 100 may include an IR sensor that can output signals for use in determining when the robot 100 is following a wall. The left side L of the robot 100 can also have a wall following sensor of this type. The forward portion 104 of the body 102 includes a bumper 115, which is used in detecting obstacles in a drive path of the robot 100. The bumper 115 and/or the robot body 102 can include sensors that detect compression of the bumper 115 relative to the robot body 102, such as compression based on contact with an obstacle. In some implementations, the top of the robot 100 includes an omnidirectional infrared (IR) transceiver 118 that can detect infrared radiation emitted from objects in the environment. These sensors can cooperate with other user inputs to provide instructions to the robot 100 regarding boundaries or obstacles in the environment.

Figure 2A:
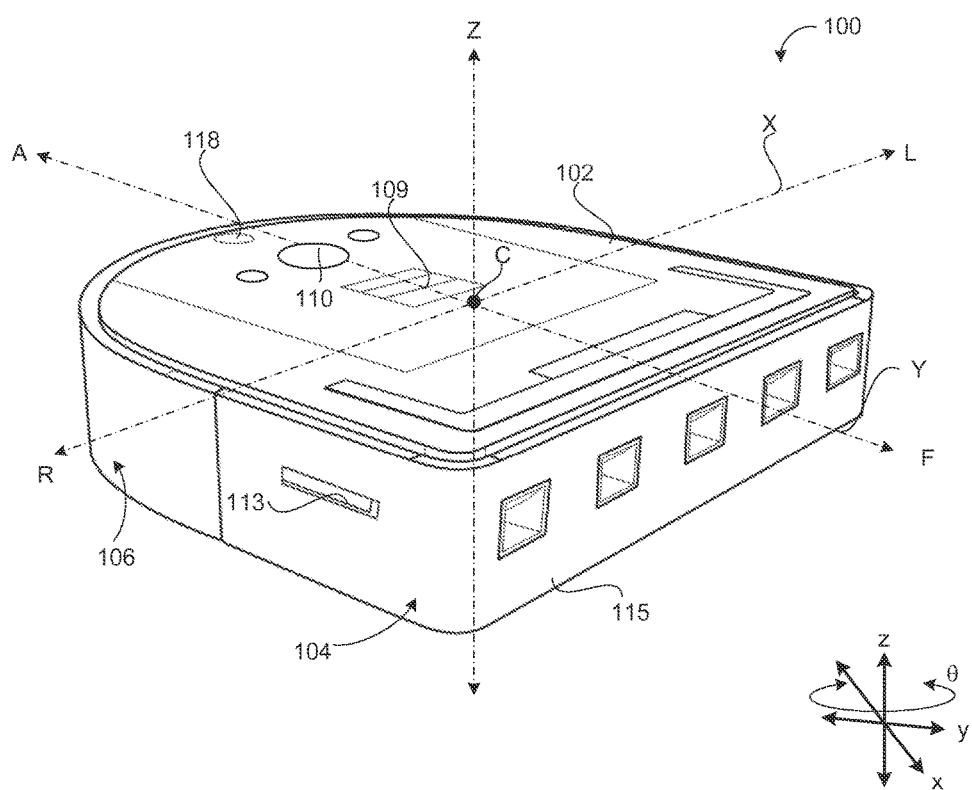
FIG. 2A shows a perspective view of a robot.
Figure 2B:
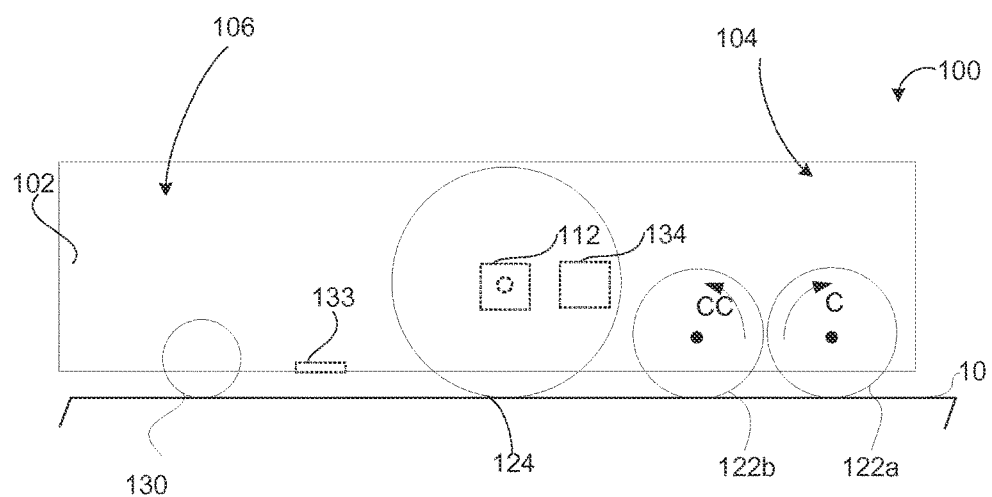
FIG. 2B shows a cut-away side view of the robot of FIG. 2A.

Referring to FIG. 2B, a front roller 122a and a rear roller 122b cooperate to retrieve debris from a cleaning surface. More particularly, the rear roller 122b rotates in a counter-clockwise sense CC, and the front roller 122a rotates in a clockwise sense C. The robot 100 further includes a caster wheel 130 disposed to support the rearward portion 106 of the robot body 102. The bottom portion of the robot body 102 includes wheels 124 that support the robot body 102 as the robot 100 navigates about a floor surface 10. As the wheels 124 are driven, rotary encoders 112 measure the position of a motor shaft driving the wheels, which can be used to estimate the distance traveled by the robot 100.

The bottom of the robot body 102 includes an optical mouse sensor 133 that includes a light source and a low-resolution camera. The robot 100 can use the optical mouse sensor 133 to estimate drift in the x and y directions as the robot 100 navigates about the environment.

The robot body 102 further houses an inertial measurement unit (IMU) 134, e.g., a three-axis accelerometer and a three-axis gyroscope to measure (i) x, y, and z acceleration and (ii) rotation about the x-, y-, and z-axes (e.g., pitch, yaw, and roll), respectively. The accelerator of the IMU 134 can be used to estimate drift in the x and y directions, and the gyroscope of the IMU 134 can be used to estimate drift in the orientation θ of the robot 100. These measurement devices, e.g., the IMU 134, the optical mouse sensor 133, and the rotary encoders 112, cooperate to provide, to the controller, information (e.g., measurements represented as signals) about the location and orientation of the robot that the controller uses to determine the approximate location and orientation of the robot 100 in its environment. In some implementations, these measurement devices may be combined into a single device or into two devices.

Figure 3A:
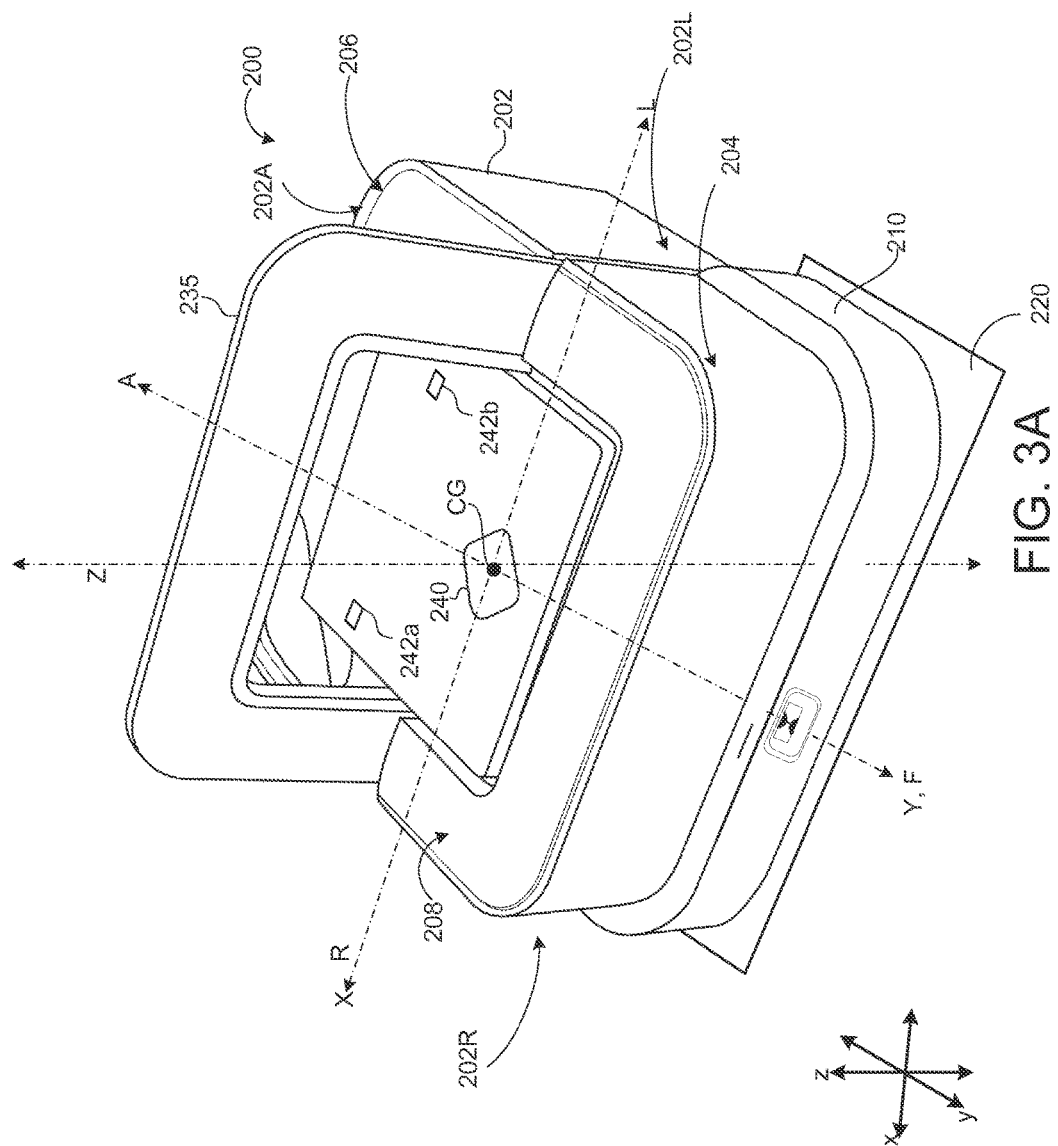
FIG. 3A shows a perspective view of another robot.
Figure 3B:
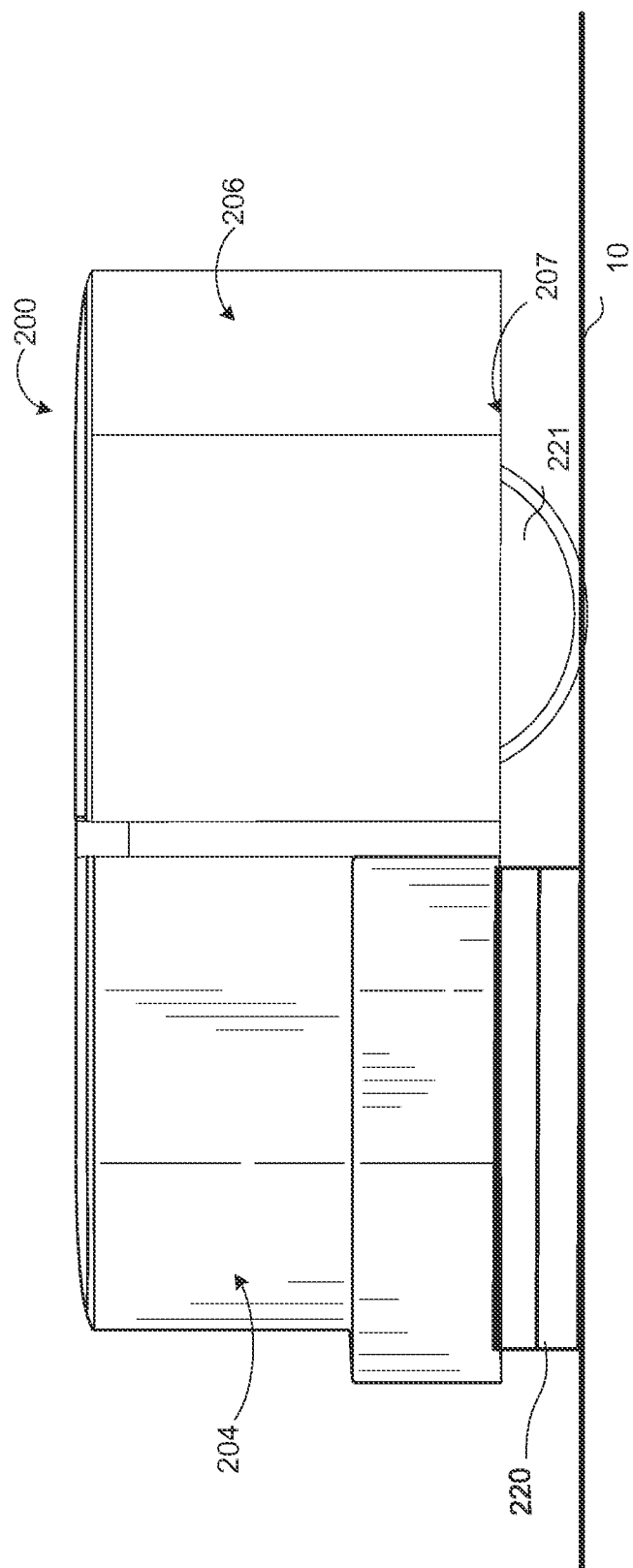
FIG. 3B shows a side view of the robot of FIG. 3A.

FIGS. 3A and 3B show another example of a mobile robot that can create virtual barriers according to the example techniques described herein. Referring to FIG. 3A, in some implementations, a mobile robot 200 weighs less than 5 lbs (e.g., less than 2.26 kg). The robot 200 is configured to navigate and clean a floor surface. The robot 200 includes a body 202 supported by a drive (not shown) that can maneuver the robot 200 across the floor surface based on, for example, a drive command having x, y, and θ components. As shown, the robot body 202 has a square shape and defines an X-axis and a Y-axis. The X-axis defines a rightward direction R and a leftward direction L. The Y-axis defines a rearward direction A and a forward direction F of the robot 200. Also referring to FIG. 3B, a bottom portion 207 of the robot body 202 holds an attached cleaning pad 220, which supports a forward portion 204 of the robot 200. The bottom portion 207 includes wheels 221 that rotatably support a rearward portion 206 of the robot body 202 as the robot 200 navigates about the floor surface. Mobile robot 200 may also include an IMU, an optical mouse sensor, and rotary encoders, as described herein, to output, to the controller, information representing the current orientation and location of the robot.

The body 202 includes a movable bumper 210 for detecting collisions in longitudinal (A, F) or lateral (L, R) directions. That is, the bumper 210 is movable relative to the body 202 of the robot, and this movement may be used to detect collisions by detecting when the bumper 210 is compressed.

The top portion 208 of the robot 200 includes a handle 235 for a user to carry the robot 200. The user can press a clean button 240 to turn on and off the robot 200 and to instruct the robot 200 to, for example, begin a cleaning operation or mark a virtual barrier in its occupancy grid. In some implementations, the top portion 208 also includes lights 242a and 242b or other visual indicators aligned along a line parallel to the back side 202A of the robot body 202. The lights 242a and 242b can be light-emitting diodes (LEDs). As described herein, the lights 242a and 242b can serve as a reference line for a user to determine the placement of a virtual barrier in an occupancy grid of the robot 200.

Figure 4:
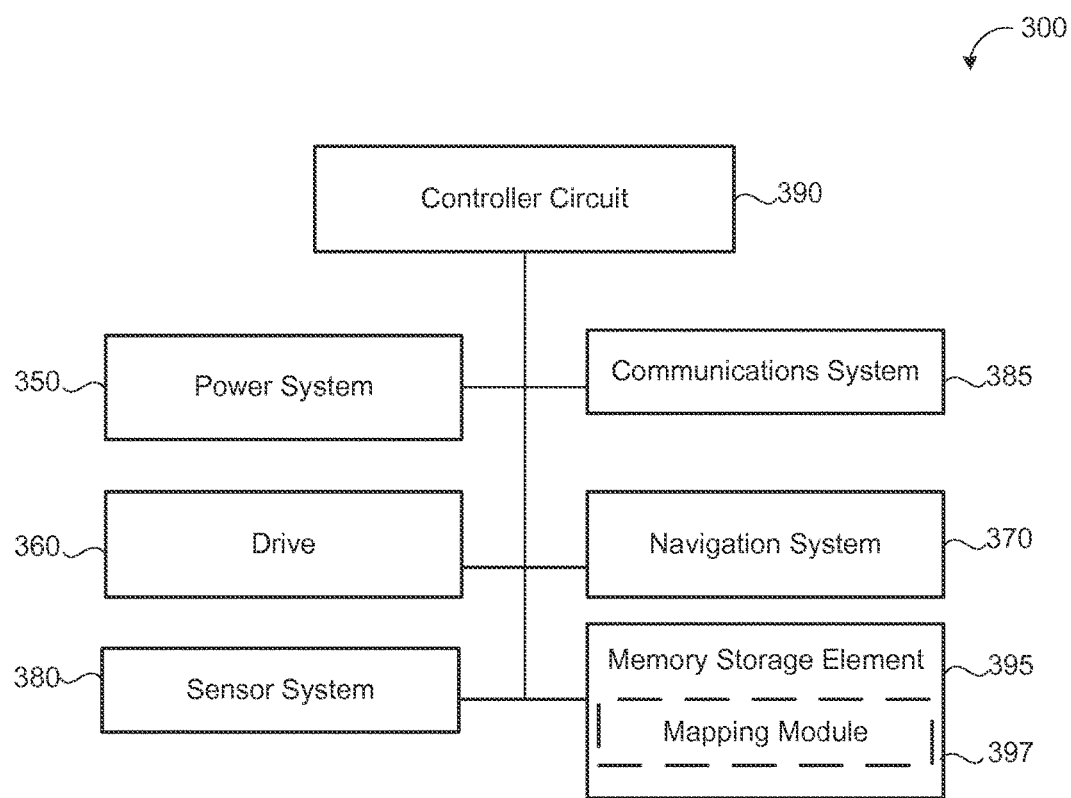
FIG. 4 is an example control system for use with mobile robots.

Referring to FIG. 4, a robot (e.g., the robot 100, the robot 200, and other appropriate mobile robot, including those described herein) includes an example control system 300 that includes a power system 350, a drive 360, a navigation system 370, a sensor system 380, a communications system 385, a controller circuit 390 (herein also referred to as controller), and a memory storage element 395. The power system 350, which includes a power source, provides electric power to the systems operable with the robot.

The drive 360 can maneuver the robot across the floor surface. The drive 360 can control motors to drive wheels (e.g., the wheels 124, 221) such that the wheels can propel the robot in any drive direction along the floor surface. The wheels can be differentially operated such that the robot can turn based on a level of drive supplied to each drive wheel.

The navigation system 370, which may be a behavior-based system executed on the controller 390, can send instructions to the drive system 360 so that the robot can use the drive 360 to navigate an environment. The navigation system 370 communicates with the sensor system 380 to issue drive commands to the drive 360.

In some implementations, the sensor system 380 includes sensors disposed on the robot, (e.g., obstacle detection sensors, the wheel encoders 112, the optical mouse sensor 133, the IMU 134) that generate signals indicative of data related to features of structural elements in the environment, thereby enabling the navigation system 370 to determine a mode or behavior to use to navigate about the environment to enable complete coverage of a room or cell. The mode or behavior can be used to avoid potential obstacles in the environment, including wall surfaces, obstacle surfaces, low overhangs, ledges, and uneven floor surfaces. The sensor system 380 creates a perception of the robot's environment sufficient to allow the robot to make intelligent decisions about actions (e.g., navigation actions, drive actions) to take within the environment. The sensor system 380 gathers the data to allow the robot to generate an occupancy grid of the environment.

In some implementations, the sensor system 380 can include obstacle detection obstacle avoidance (ODOA) sensors, ranging sonar sensors, proximity sensors, radar sensors, LIDAR (Light Detection And Ranging, which can entail optical remote sensing that measures properties of scattered light to find range and/or other information of a distant target) sensors, a camera (e.g., the camera 109, volumetric point cloud imaging, three-dimensional (3D) imaging or depth map sensors, visible light camera and/or infrared camera), and wheel drop sensors operable with caster wheels (e.g., the caster wheel 130). The sensor system 380 can also include communication sensors, navigation sensors, contact sensors, a laser scanner, and/or other sensors to facilitate navigation, detection of obstacles, and other tasks of the robot. The proximity sensors can take the form of contact sensors (e.g., a sensor that detects an impact of a bumper on the robot with a physical barrier, such as a capacitive sensor or a mechanical switch sensor) and/or proximity sensors that detect when the robot is in close proximity to nearby objects.

The controller 390 operates with the other systems of the robot by communicating with each system to provide and to receive input and output parameters. The controller 390 may facilitate communication between the power system 350, the drive system 360, navigation system 370, the sensor system 380, the communications system 385, and the memory storage element 395. For instance, the controller 390 can instruct the power system 350 to provide electrical power to the motors of the drive system 360 to move the robot in the forward drive direction F, to enter a power charging mode, and/or to provide a specific level of power (e.g., a percent of full power) to individual systems. The controller 390 may also operate the communications system 385, which can include a wireless transceiver including a transmitter that can communicate with mobile devices or a central computer network. As described herein, the controller 390 may upload an occupancy grid generated during a cleaning operation of the robot to the central computer network or individual mobile devices. The communications system 385 may also receive instructions from a user.

The controller 390 can execute instruction to map the environment and regularly re-localize the robot to the map of the environment. The behaviors include wall following behavior and coverage behavior.

In general, during wall following behavior, the robot detects a wall, obstacle (e.g., furniture, breakfast bar, cabinet toe kick, etc.), or other structure (e.g., fireplace hearth, stair edge, etc.) in the environment (using, for example, the bumper 115), and follows the contours of the wall, obstacle or other structure.

During the coverage behavior, the controller instructs the robot to cover (e.g., traverse or navigate the extent of) and to clean the floor surface of the environment. The robot can cover the floor surface of the environment using coverage path techniques, such as a boustrophedon or cornrow pattern, a spiral pattern, or a pseudo-random bounce coverage. As the robot covers the floor, the controller 390 can generate an occupancy grid.

In some implementations, the controller 390 may use, for example, information (e.g., signals) from the encoders 112, the optical mouse sensor 133, and the IMU 134 to generate odometry data that can be used to determine (e.g., to estimate) the position and orientation (pose) of the robot. For example, the controller can receive gyroscope signals from the 3-axis gyroscope of the IMU 134. The gyroscope signals can be based on an orientation and position of the body of the robot as the robot navigates a floor surface. The controller can also improve the estimate using signals from the encoders 112, which deliver encoder signals based on the distance traveled by the robot. Similarly, the optical mouse sensor 133 generates signals that can be used to determine the amount of drift of the robot as the robot navigates about the floor surface.

The memory storage element 395 can include a mapping module 397 that stores an occupancy grid of a room or rooms that the robot navigates. The occupancy grid can be uploaded to a remote computing device using the communications system 385 after a cleaning operation. In some implementations, the occupancy grid includes a virtual map generated by the controller 390 and used by the controller 390 to instruct the robot 100 to navigate within pre-determined boundaries, physical boundaries, and other boundaries (e.g., virtual or use-established barriers or boundaries). The occupancy grid may include the physical layout of the environment. For example, the occupancy grid may include data indicative of the physical layout of the area and represent both open areas and obstacles. The occupancy grid can include a boundary of the environment, boundaries of obstacles therein, boundaries generated before starting a cleaning operation that may or may not correspond to physical obstacles in the environment, and/or the interior floor space traversed by the robot.

The occupancy grid may be implemented in any appropriate manner, including without limitation, as a map of locations of properties, using database techniques, using a variety of associative data structures, or any other method of organizing data. Thus, the resulting map need not be a visible map, but may be defined via data stored in non-transitory computer readable memory. A map may correspond to an actual surface with different degrees of precisions and/or accuracy. Precision may be affected, for example, by the use of discrete map cells that correspond to a portion of the surface. The size of those cells, which may each correspond to a 10 cm×10 cm portion of the surface, or a 5 cm×5 cm portion of the surface (for example—they need not be square or even all of the same size) may affect precision by imposing limitations on the granularity of observed properties. Accuracy may be affected by sensor quality and the like, including various other factors mentions herein.

In some implementations, the occupancy grid is an occupancy grid including a 2D grid of cells with each cell having an associated variable indicative of the status of the area for traversal or cleaning. Each cell in the occupancy grid can be assigned a value indicating whether the cell is traversable or non-traversable. Each cell of the grid can be assigned (x, y) coordinates based on a chosen origin (0, 0) cell in the environment. The chosen origin can be, for example, the charging dock of the robot or a particular location in the room. Each cell can represent a square area with four sides that coincide with the sides of other cells. The cells can have a side length between 1 and 100 cm in some implementations. For example, the grid can be a grid of cells, each 10 cm×10 cm. Cells of the occupancy grid can be populated before a cleaning operation and during the cleaning operation. In some cases, the populated cells from one cleaning operation can be stored and used for a subsequent cleaning operation. Before a cleaning operation, a subset of cells of the occupancy grid can be marked as non-traversable. In some cases, the cells form a user-established virtual barrier that represents a non-traversable boundary for the robot (e.g., the virtual barrier may be defined by a line of non-traversable cells in the occupancy grid). As described herein, the cells can be marked as part of a previous cleaning operation, or the robot can receive instructions to pre-populate some cells of the occupancy grid as non-traversable. In another implementation, the occupancy grid can be an occupancy graph where the virtual barrier is represented as a line segment defined by two or more coordinates, a virtual polygon defined by three or more coordinates, or any other geometric shape or "lasso" shape defined by multiple coordinates.

During a cleaning operation, the controller 390 stores the (x, y) coordinates of each cell traversed by the robot. During wall following behavior, for example, the controller 390 can mark all cells under the footprint of the robot as traversable cells and mark all the cells corresponding to the wall being followed as non-traversable to indicate that the robot 100 cannot pass the wall. As described herein, the controller 390 may be configured to recognize specific sequence, combinations, groups, etc., of cells that represent features of the structural elements in the environment (e.g., walls, obstacles, etc.). In some implementations, before determining the value of cells in the map, the controller 390 can pre-set the values of all cells to be unknown. Then, as the robot drives during the wall following behavior or during the coverage behavior, the values of all cells along its path are set to traversable, the location of the cells being determined by the distance to the origin. In some cases during the cleaning operation, the sensor system 380 may additionally or alternatively respond to features (e.g., markers) located in the room, and the controller 390 may indicate a virtual barrier in the occupancy grid based on sensing the features.

In addition to marking cells as non-traversable as described herein, several methods to generate virtual barriers and non-traversable cells are also described herein. During a cleaning operation, the controller can instruct the robot to avoid the areas designated in the occupancy grid as non-traversable. While the occupancy grid is often stored on the robot (e.g., on the memory storage element 395), the occupancy grid may be transmitted through the communications system 385 and stored on a network server, a mobile device, or other remote computing device.

The examples herein describe an environment and a corresponding occupancy grid for the environment. The occupancy grids in FIGS. 5A, 5B, 6A, 6B, 7A, 8A, and 8B use hashed cells to identify non-traversable areas, the blank cells to identify traversable areas, and areas not otherwise marked with cells to identify unknown areas. The robot shown in the corresponding occupancy grid identifies the controller's estimate of the robot's current location in the environment.

While the occupancy grids described in FIGS. 5A, 5B, 6A, 6B, 7A, 8A, and 8B show examples of occupancy grids that include cells to indicate traversable and non-traversable areas of the environment, in other implementations, the controller can generate an occupancy grid that relies on coordinate values corresponding to locations within the environment. For example, a virtual barrier can be a set of two or more two-dimensional coordinates that indicate the vertices of a line or region that the robot cannot cross.

Figure 5A:
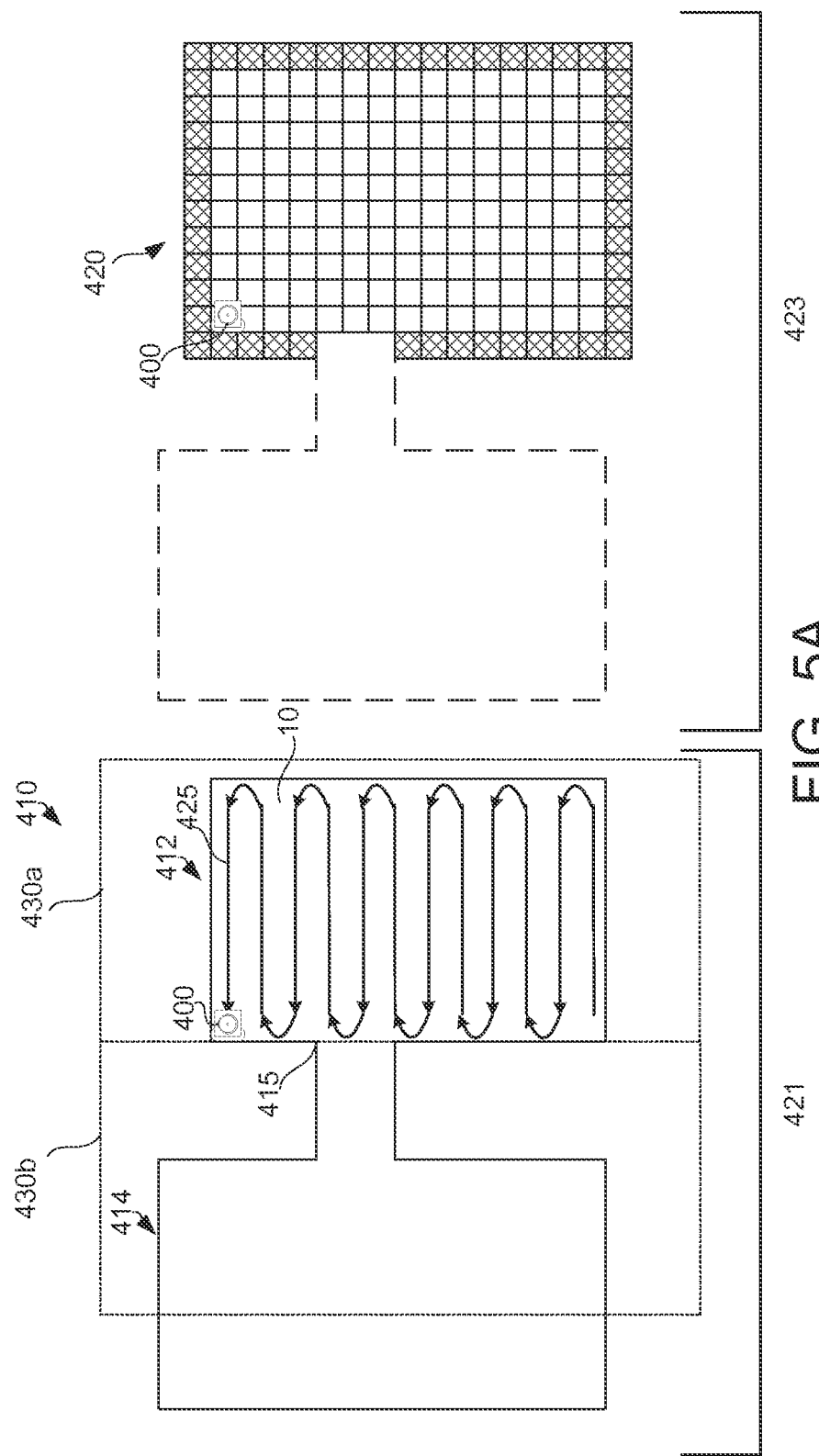
FIGS. 5A to 5C include illustrations and a flowchart showing a process by which a mobile robot creates an invisible or virtual barrier for the robot.

In some implementations, the robot may execute multiple cleaning operations to clean multiple rooms in an environment. Referring to FIG. 5A, as a robot 400 navigates about the floor surface 10 of an environment 410 containing a first room 412 and a second room 414 (e.g., as shown in portion 421 of FIG. 5A), the controller 390 of the robot 400 generates a corresponding occupancy grid 420 (e.g., an occupancy grid stored in the memory storage element 395, as shown in portion 423 of FIG. 5A) of the environment 410. A doorway 415 separates the first room 412 and the second room 414. As described in more detail herein, the robot 400 can first clean the first room 412 and then proceed to clean the second room 414 without returning to the first room 412.

The robot 400 executes a cornrow pattern along a path 425. The path 425 can be generally restricted to a first region 430a. Regions 430a and 430b may be regions of equal width that the robot 400 sets in order to segment an environment. The regions may be arbitrarily selected and therefore may or may not correspond to physical boundaries, obstacles, or structures within the environment.

As the robot 400 follows coverage behavior by executing the cornrow pattern along the path 425, in order to restrict itself to the region 430a, the robot 400 may stop itself from entering a region 430b of the environment. The controller 390 can instruct the robot 400 to avoid entering the region 430b and to turn around during execution of the ranks of the cornrow pattern. In the occupancy grid 420, the controller 390 indicates non-traversable cells that correspond to walls of the environment and indicates traversable cells as areas that the robot 400 was able to cover during the coverage behavior.

Figure 5B:
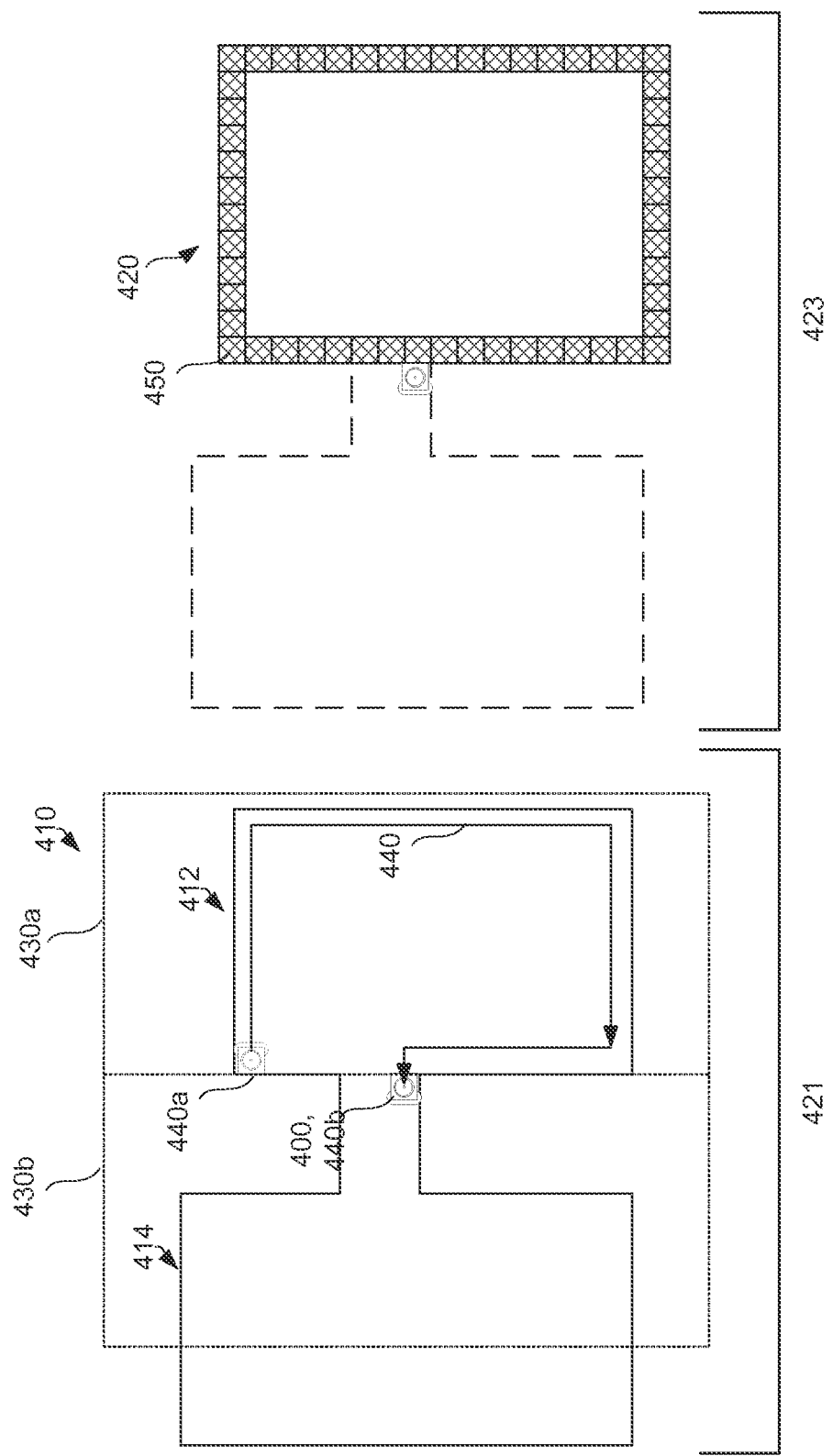

When the controller 390 has determined that the robot 400 has been able to cover the traversable areas of the region 430a, the robot 400 can execute wall following behavior to advance to another region of the environment 410, for example the region 430b. The controller 390 can determine that the robot 400 has completed covering the first region 430a by determining that the robot 400 has met one or more conditions. Referring to FIG. 5B, as shown in the portion 421, the robot 400 can follow a path 440 to perform wall following. The robot 400 starts at an initial position 440a that corresponds to the position of the robot 400 when it completed the coverage behavior. At a position 440b along the path 440, the robot 400 crosses from the first region 430a into the second region 430b. At this point, the controller 390 determines that the robot 400 has entered a new region. The controller 390 can make this determination by, for example, determining that the robot 400 has moved from a traversable cell to an unknown cell. The controller 390 can also determine that the robot 400 has exited the first region 430a and entered the second region 430b.

In order to prevent the robot 400 from returning to the region 430a, where it has already executed a cleaning operation, the controller 390 can establish a virtual barrier 450 that marks regions that the robot 400 has already cleaned, as shown in the portion 423. For example, the controller 390 can update the occupancy grid 420 to identify a location or boundary of the previously cleaned area to prohibit the robot 400 from returning to the area. During a cleaning (e.g., non-docking) operation and/or can mark all cleaned cells in the occupancy grid 420 to prohibit the robot 400 from re-cleaning those cells during the cleaning operation. In some examples, the controller 390 can mark perimeter cells forming the perimeter of the room 412 as non-traversable in the occupancy grid 420. In some cases, the controller 390 marks the cells that encompass the traversable cells of the region 430a as non-traversable to stop the robot 400 from returning to regions that the robot 400 has already cleaned. In other cases, the controller 390 can indicate all cells in the region 430a as non-traversable.

Figure 5C:
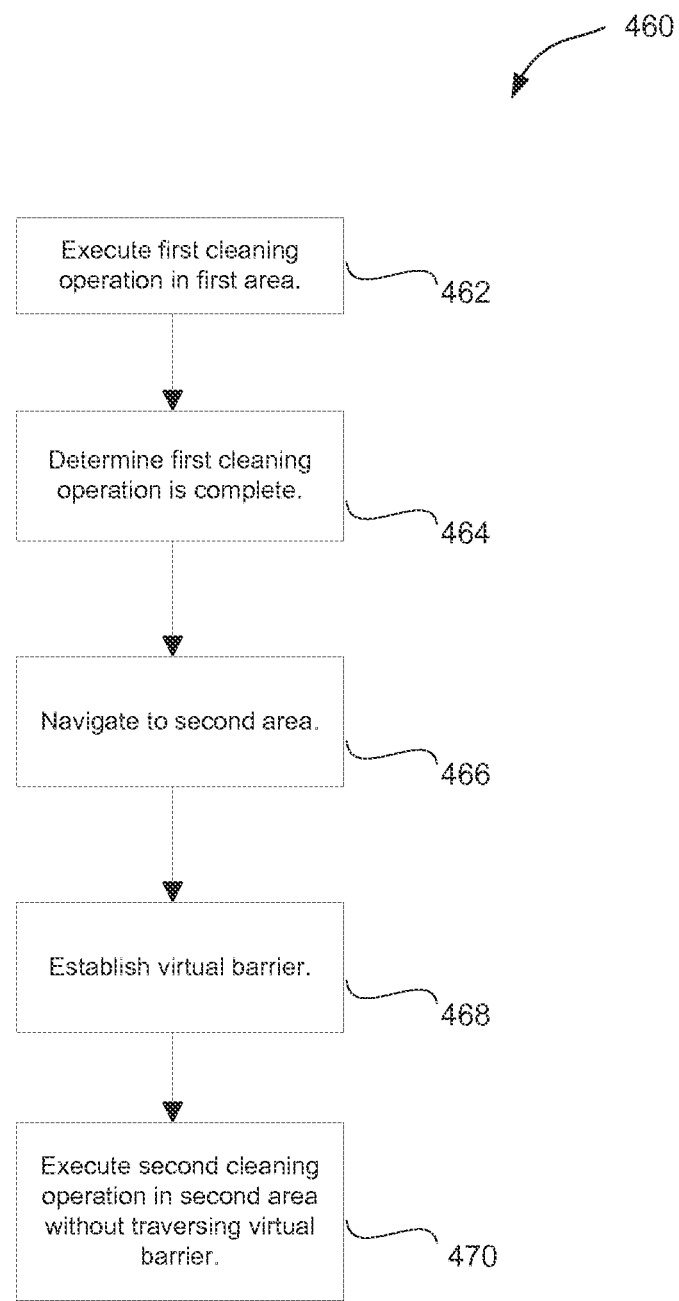

Referring to FIG. 5C, a flow chart 460 illustrates a method for a robot to clean a first area and a second area. At operation 462, the robot executes a first cleaning operation in a first area. The robot can execute the first cleaning operation in response to instructions issued by a controller of the robot. The robot can execute a coverage behavior described herein, which can include following a cornrow pattern or other patterns to cover the first area. As the robot performs the coverage behavior, the controller can mark cells in an occupancy grid stored on the robot (e.g., on a memory storage element operable with the controller) corresponding to portions of the first area traversed by the robot as traversable. The cleaning operation may be executed by a dry cleaning robot, such as the robot 100, a wet cleaning robot, such as the robot 200, another mobile robot configured to navigate about an environment.

At operation 464, the robot, via the controller, determines that the first cleaning operation is complete. The controller can determine the completion based on one or more conditions described herein.

At operation 466, the robot navigates to a second area. In some examples, the robot can traverse a perimeter of the first area to identify the second area. In other examples, the first area may be artificially bounded (e.g., be a maximum width) and the second area can be a region adjacent to the first area. The controller can instruct the robot to perform the navigation. Generally, the controller can seek to determine that the robot has exited an area that it has already cleaned and has entered an area that it has not cleaned. The controller can instruct the robot to traverse the perimeter after the robot has completed the cleaning operation of the first area. The controller can determine that the robot has completed the cleaning operation based on detecting that the robot has fulfilled one or more conditions. In some cases, the robot may continue the cleaning operation until the robot has covered a percentage of the area of the first room, for example, 50% to 75%, 75% to 100%, 100% to 150%, 150% to 200%, 250% to 300%. In some cases the robot may continue the cleaning operation until it has the area multiple times, for example, once, twice, three times, or four times. Upon completing the desired coverage, the controller may instruct the robot to cross the virtual barrier and begin a second cleaning operation in the second room.

In some implementations, the robot may continue the cleaning operation until the robot has reached a certain lower limit charge percentage, for example, 10%, 5%, or less. Upon reaching the lower limit charge percentage, the controller can instruct the robot to return to a charging dock or charging station to re-charge a battery of the robot. In such implementations, the robot may be able to traverse virtual barriers stored in the occupancy grid in order to return to the charging dock.

In some cases, the first area is a room and the perimeter of the first area thus can correspond to walls of the room. In other implementations, the first area is a region (as described herein), and the perimeter of the first region may correspond to the edge of the expanse of the first region. As described with respect to FIGS. 5A to 5B, when the robot 400 executes the wall following behavior, the controller 390 can determine that it has traversed a perimeter of the first room 412 or the first region 430a by, for example, (i) detecting that the robot 400 has exited the first region 430a or (ii) detecting that the robot 400 has moved from a traversable cell to an unknown cell. The robot can traverse the perimeter of the first area in response to instructions from the controller.

At operation 468, the controller establishes a virtual barrier that, for example, separates the first area and the second area. The controller can indicate the virtual barrier on an occupancy grid stored on a memory storage element operable with the controller. For example, in some implementations, the controller can indicate on the occupancy grid that unknown cells adjacent to traversable cells (e.g., a row or a column of traversable cells, two or more traversable cells that form a row or column of cells) in the first area are non-traversable (e.g., that the non-traversable cells define a virtual barrier). As a result, the non-traversable cells can form a row or column of non-traversable cells. Other methods of defining the boundary that do not rely on the occupancy grid may also be used. In some cases, the controller can indicate that traversable cells in the first area adjacent to unknown cells are now non-traversable.

At operation 470, the robot executes a second cleaning operation to clean the second area without traversing the virtual barrier. For example, the robot can clean the second area without traversing a virtual barrier marking the perimeter of the first area. The controller can issue an instruction to the robot to execute the second cleaning operation. The second cleaning operation can be an execution of a coverage behavior. To prevent itself from entering the first region, the controller can prevent the robot from traversing the virtual barrier established in operation 468.

In some examples, a user may desire to set a virtual boundary for the robot. For example, the user may want to keep the robot out of a particular room or area. Allowing the user to establish the location of a virtual boundary can provide the advantage of giving the user additional control of where the robot cleans. In some implementations, the controller can receive instructions from a user to confine navigation of the robot within an area of the environment. The user can deliver the instructions by triggering sensors (e.g., pushing one or more buttons) on the robot. In some cases, the user can use a mobile device, such as a smartphone, tablet, or other computing device, to deliver the instructions to the controller using a wireless connection to establish the location of the virtual barrier. The user may seek to keep the robot from exiting a room through a doorway, and thus can instruct the controller to generate a virtual barrier located at the doorway that prevents the robot from exiting through the doorway. In some implementations, the user enters information to restrict robot movement through the robot's user interface.

Figure 6B:
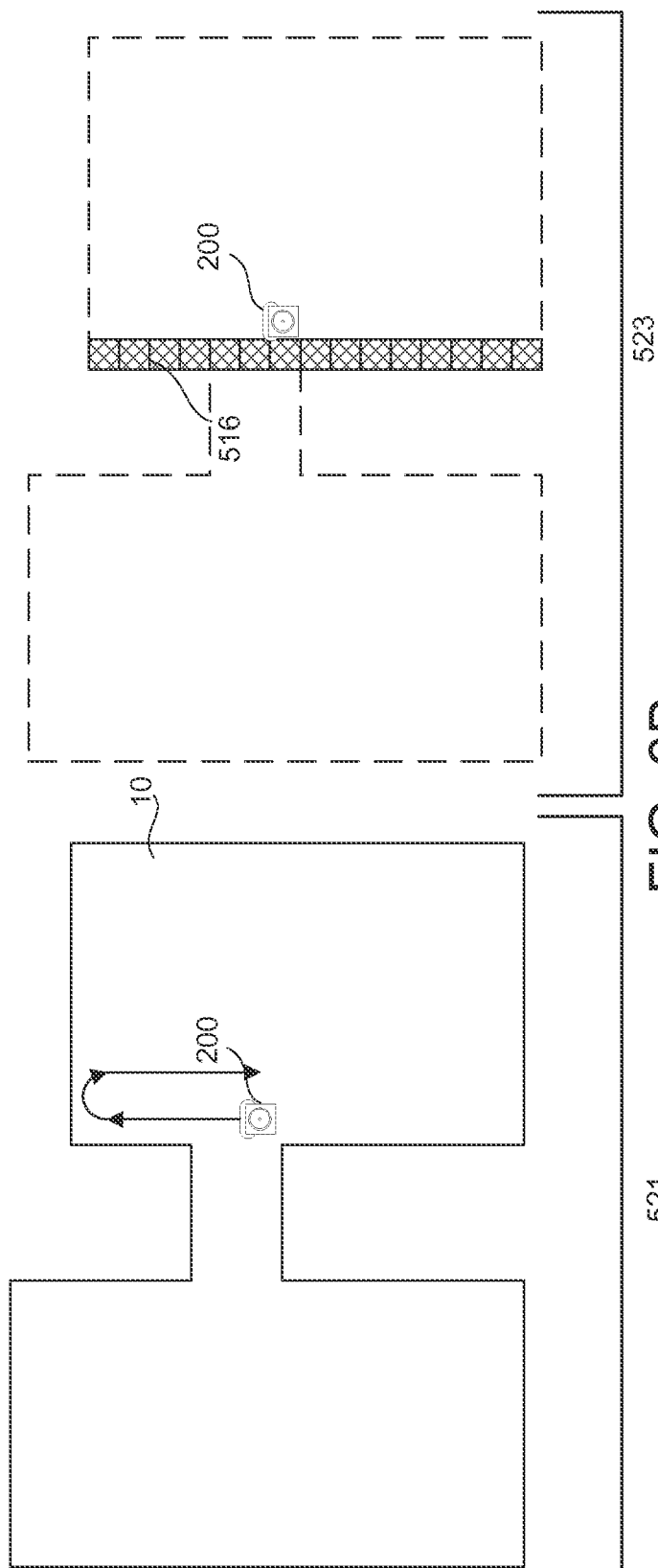
Figure 6C:
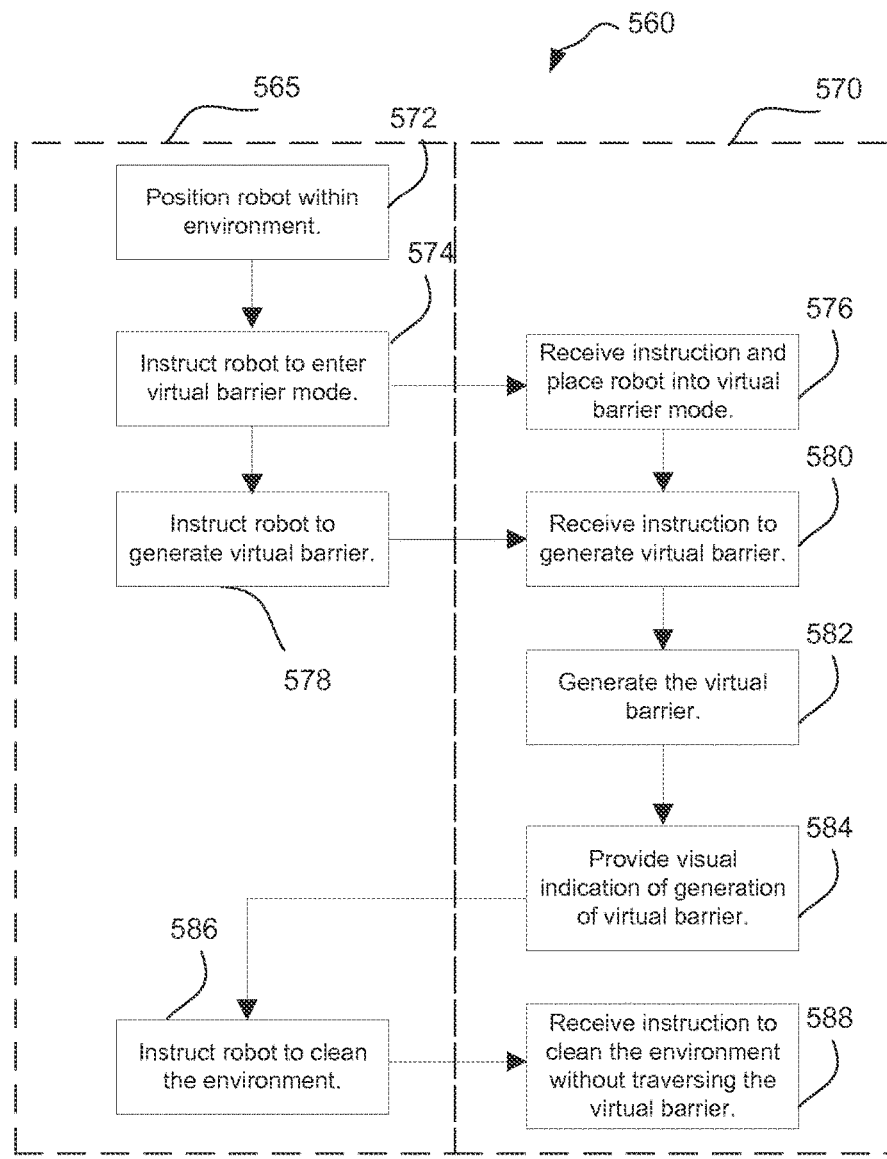

In the example illustrated in FIGS. 6A to 6C, a user places a robot (e.g., the robot 200 described with respect to FIGS. 3A to 3B) in an environment 502 before the robot 200 executes a cleaning operation to clean the floor surface 10 of the environment 502. A controller (e.g., the controller 390) of the robot 200 generates an occupancy grid 518 corresponding to the environment 502. In this example, the user may wish to sequentially clean a first room 504 during a first cleaning operation and a second room 506 during a second cleaning operation. The user may seek to have the robot 200, in one cleaning operation, clean the first room 504 without cleaning the second room 506 in the environment 502.

Referring to FIG. 6A, the user positions the robot 200 in the environment 502 such that the back side 202A of the body 202 of the robot 200 is placed parallel to a wall 512 and a doorway 517 in the environment 502, as shown in portion 521. The user then issues an instruction to the controller 390 to generate a virtual barrier 516 in the occupancy grid 518, as shown in portion 523. In some examples, the virtual barrier 516 may manifest in the occupancy grid 518 as a line (e.g., a row or column) of non-traversable cells based on the initial position and orientation of the robot 200 in the environment 502. The virtual barrier 516 can be parallel to the back side 202A of the robot 200.

In some cases, the virtual barrier 516 passes through the back side 202A of the robot 200. In other cases, the virtual barrier 516 intersects the robot body, e.g., the virtual barrier passes through the lights 242a and 242b enabling the user to align the lights with the location of the virtual barrier. The lights 242a and 242b therefore may serve as visual indicators of the location of the virtual barrier 516. The virtual barrier 516 can prevent the robot 200 from passing from the first room 504 through a doorway 517 into the room 506 of the environment 502. In some implementations, the robot can be placed in the doorway 517 so that the controller generates the virtual barrier 516 that prevents the robot 200 from passing through the doorway 517.

After the user has completed its instructions to the controller to generate the virtual barrier 516, without repositioning the robot, the user can initiate the cleaning operation in the room 504. When the robot 200 starts the cleaning operation, now referring to FIG. 6B, the robot 200 can turn 90 degrees such that the forward drive direction F of the robot 200 is parallel to the virtual barrier 516 (e.g., as shown in the portion 523 of FIG. 6B). The 90-degree turn ensures that, in the coverage behavior, the robot 200 executes the first row of the cornrow pattern adjacent to the virtual barrier 516. In some cases, drift minimally affects the first row of the cornrow pattern, so having the robot 200 execute the first row parallel to the virtual barrier 516 is advantageous because the robot 200 is not likely to cross the virtual barrier. In addition, the 90-degree turn prevents the 180-degree turns in the cornrow pattern from occurring at the virtual barrier 516. After the robot 200 turns, the robot 200 can then proceed to execute a coverage behavior (e.g., performing the cornrow pattern). In some cases, the robot 200 may move in the forward drive direction a short distance (e.g., 2 to 5 cm, 5 to 10 cm, 10 to 15 cm) and then turn 90 degrees to align a lateral side of the robot 200 to be parallel with the virtual barrier 516. For example, the robot may move forward by the distance between the visual indicators (e.g., the lights 242a, 242b) and the back side of the robot 200.

The user can provide the instructions to the robot 200 through a number of methods and mechanisms. The controller can respond to a trigger that places the robot 200 in a handshake or virtual barrier mode where the controller is prepared to populate an occupancy grid with the virtual barriers. When the robot 200 is in the handshake mode, the controller places the virtual barrier 516. The trigger can be, for example, the user simultaneously compressing the bumper 210 of the robot 200 and pressing the clean button 240 of the robot 200 while robot is either on or off the ground (e.g., as determined by sensing the ground using appropriate sensors, as described herein). The user may manipulate the robot 200 in other ways as well to toggle the trigger and initiate the handshake mode. For instance, the user may trigger the accelerometer or gyroscope of the robot 200 by shaking the robot 200, and upon sensing the shake, the robot 200 enters the handshake mode to place one or both of the virtual barriers. In some cases, the user may instruct the robot 200 using a mobile device. The user may position the robot 200 in the environment and then instruct the robot 200 by, for example, using an application loaded on the mobile device. In some implementations, the controller, upon placing the robot into the handshake mode, awaits further instructions from the user to generate the virtual barrier. The user can issue another instruction—after instructing the robot to enter the handshake mode—to place the virtual barrier 516 in the occupancy grid.

In some implementations, the controller can generate a second virtual barrier that may be perpendicular or otherwise angled relative to the first virtual barrier 516. The second virtual barrier may restrict the robot from a region that may be a difficult-to-clean area or an area with fragile furniture or household items. The second virtual barrier may be a virtual barrier of non-traversable cells in the occupancy grid 518. The virtual barrier can be generated based on the initial position and/or orientation of the robot 200. In some examples, the first and second virtual barriers can form L-shape of non-traversable cells. In some cases, the second virtual barrier may coincide with the right side 202R or the left side 202L of the robot body 202. In other examples, the controller may generate the second virtual barrier such that the second virtual barrier passes through the light 242a or the light 242b. The controller can generate the second virtual barrier in response to the instruction to generate the first virtual barrier. In other implementations, the controller generates the second virtual barrier in response to a second instruction from the user to generate a virtual barrier. In some cases, the controller places the second virtual barrier when the user places the robot into the handshake mode for a first time or for a second time. In cases where the controller generates two virtual barriers, the robot 200 may initiate the cleaning operation without turning to become parallel with the virtual barrier 516. In some cases, the robot 200 may initiate the cleaning operation by turning such that the robot 200 is parallel to the generated virtual barrier.

Referring to FIG. 6C, a flow chart 560 illustrates a method for a robot to generate a virtual barrier based on an instruction from a user. The flow chart includes user operations 565 corresponding to operations executed by the user and robot operations 570 corresponding to operations executed by the robot.

At operation 572, the user positions the robot within an environment. The position of the robot will serve as both the starting location of the robot and the location of the virtual barrier. As such, the user can position the robot such that a feature on the robot is aligned with (e.g., parallel to) an edge in the environment that the user does not want to the robot to cross (e.g., across which a virtual barrier is to be erected). For example, as described herein, the feature can be lights on the robot or a surface of the robot body. In some cases, the user may wish to create two (e.g., perpendicular) virtual barriers so that the robot does not cross two edges in the environment, and in such cases, the robot may have two features, each indicating a position and orientation of a virtual barrier.

At operation 574, the user instructs the robot to enter a virtual barrier mode. The user may issue this instruction using any of the methods described herein, or any other appropriate method, that trigger the robot to enter the handshake mode. At operation 576, a controller of the robot receives the instruction and places the robot into the virtual barrier mode.

At operation 578, the user instructs the robot to generate a virtual barrier. The instruction to generate the virtual barrier can be the instruction to place the robot into the virtual barrier mode (e.g., to place the robot into the handshake mode). In some cases, the user may issue a subsequent instruction—apart from the instruction to place the robot into the virtual barrier mode—to generate the virtual barrier. For example, the user may trigger additional sensors to send the instructions to create the virtual barrier.

At operation 580, the controller receives the instructions to create the virtual barrier. The controller may receive the instructions by sensing that the sensors have been triggered in the manners described herein. In some cases, the robot may include a wireless transceiver that allows the controller to communicate with a mobile device to receive instructions from the user.

At operation 582, the controller generates the virtual barrier. For example, the controller may define cells in an occupancy grid as being part of the virtual barrier. For example, the virtual barrier can correspond to one or more cells that are designated as non-traversable. In some implementations, the virtual barrier may not be defined in terms of cells in the occupancy grid. Instead, the virtual barrier may be defined based on coordinates on the occupancy grid or some other features that are within, or outside of, the context of the occupancy grid. For example, the virtual barrier is defined based on the initial orientation and position of the robot. Measurements of these orientation may be obtained, e.g., based on signals output from the gyroscope housed within the body of the robot. The controller may know the initial location of the robot, or a part thereof, in the occupancy grid immediately following the handshake. Using this information, namely the orientation and the initial location, the controller may create the virtual barrier by defining a boundary (e.g., a straight line) on the occupancy grid (or elsewhere) that the robot cannot cross. In some cases the controller may generate more than one virtual barrier as described herein. In some examples, the user can select the length of the virtual barrier by providing the controller with appropriate parameters either directly on the robot or through a remote interface. For example, the user can select a 3 to 5-foot (0.9 to 1.6 meter) barrier length to prohibit the robot from passing through a door. In some examples, the user can instruction the robot place a full length barrier of cells in a row/column for sub-dividing an open space. In another case, the user can select a rectangular region surrounding the robot, forming four virtual barriers that the robot should not cross.

At operation 584, the controller can provide a visual indication of generation of the virtual barrier. For example, the controller can instruct lights on the robot to illuminate or can issue an audible alert.

At operation 586, the user instructs the robot to clean the environment. The user can instruct the robot to clean by pressing the clean button on the robot or by using the mobile device to remotely control the robot. The virtual barrier can be displayed on a map displayed on a user's mobile device.

At operation 588, the controller receives the instruction to clean the environment without traversing the virtual barrier. The robot can execute the instructions to clean the environment by executing cornrow behavior or other movement patterns to cover a floor surface of the environment. The controller may instruct the robot to turn such that the forward drive direction of the robot is parallel to the virtual barrier. In some implementations, the controller instructs the robot to turn substantially 90 degrees to orient the robot parallel to the virtual barrier.

While the examples illustrated in FIGS. 6A to 6C have been described to use the robot 200 described in FIGS. 3A to 3B, the robot 100 and other mobile robots having other configurations can readily implement the methods described herein. The robot used to implement the methods of FIGS. 6A to 6C can have other distinctive surfaces or features that the user can use as a reference for the placement of the virtual barrier. While the robot 200 has been described to be a square robot, in some cases, the robot implementing the methods described herein may be a round or a triangular robot. As a result, the virtual barrier generated may be tangential to a back surface of the robot. The robot can also have additional or alternative sensors that the user can trigger in order to instruct the controller to generate the virtual barrier.

The methods described herein to generate a virtual barrier can occur before the robot initiates a cleaning operation. In some implementations, the robot begins the cleaning operation and navigates around an environment before the robot generates the virtual barrier or additional virtual barrier(s) may be generated during cleaning. For example, the robot can detect features, markers, or other visual indicia located in the environment and respond to the features by populating the occupancy grid with a virtual barrier or by otherwise defining one or more virtual barrier(s) that the robot cannot cross. An example of such an indicator can be a sticker or tag that is machine identifiable and can be positioned in the environment.

Figure 7A:
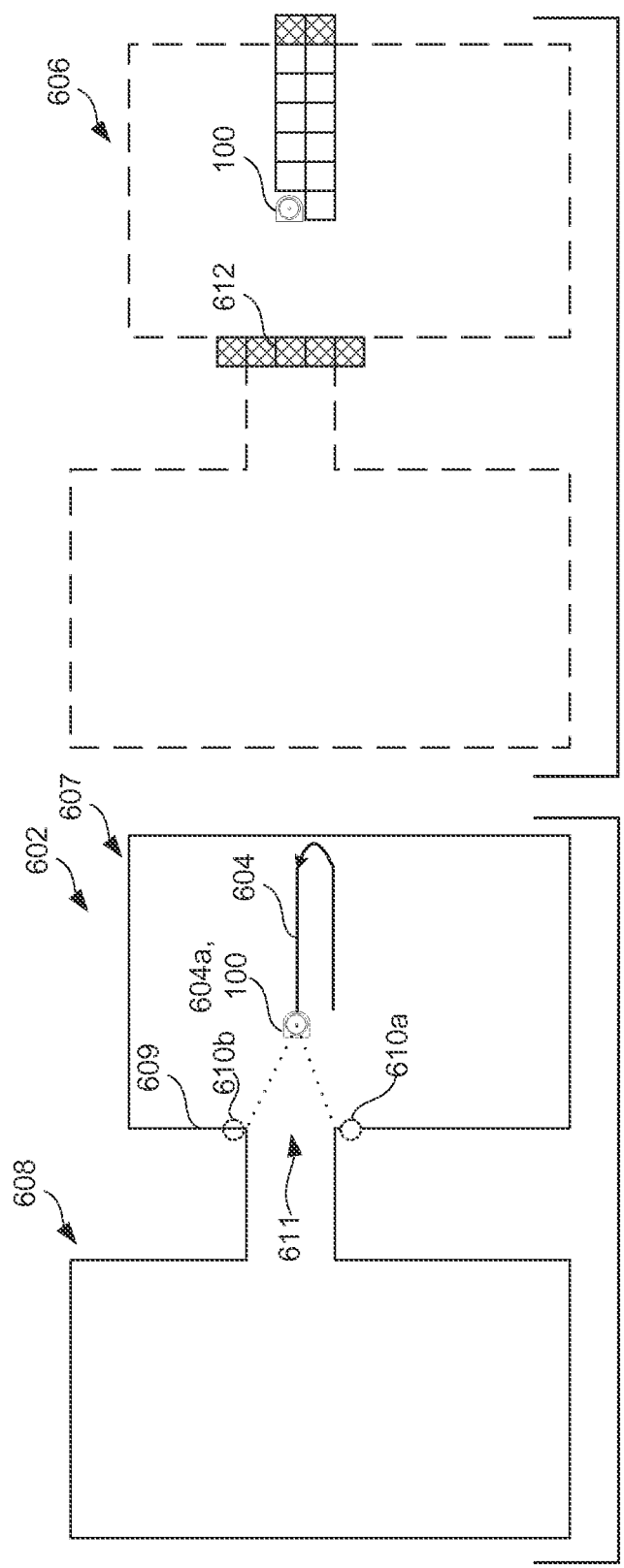

The robot 100, as described earlier, includes the camera 109 to image wall surfaces of the environment. Referring to FIG. 7A, in an example, the robot 100 is executing a coverage behavior along the floor surface 10 of an environment 602 (e.g., as shown in portion 621) as part of a cleaning operation. Executing the cornrow pattern, the robot 100 follows a path 604 and designates cells in an occupancy grid 606 as traversable or non-traversable (e.g., as shown in portion 623). The environment 602 includes a first room 607 and a second room 608. The robot 100 is executing the cleaning operation to clean the first room 607. Along the path 604, the robot 100 can sense (e.g., a capture an image of) a wall surface 609 of the environment 602 using the camera 109.

At a point 604a along the path 604, the robot 100 detects markers 610a, 610b located on the wall surface 609. A user may place the markers 610a, 610b on the wall surface 609 to restrict the robot 100 from entering a region of the environment. For example, the markers 610a, 610b may indicate that a traversable area by the robot 100 should be marked as non-traversable in the occupancy grid 606 of the robot 100. The markers 610a, 610b can be fixed to the wall surface 609 through, for example, an adhesive or static backing. The markers 610a, 610b may include suction cups that can generate a suction force to fix the cups to surfaces of the environment 602. In some implementations, the markers 610a, 610b include infrared dots or ink that may be detectable by an infrared transceiver of the robot 100 without being human perceptible under normal conditions.

In the example shown in FIGS. 7A to 7B, the feature is a doorway 611 that connects the first room 607 to the second room 608. The user places the markers 610a, 610b approximately 1 m to 2 m above the floor surface on the wall surface 609 so that the robot 100 can detect the markers 610a, 610b using the camera 109, which is angled upward toward the wall surface 609. In some examples, the markers 610a, 610b can be above the doorway or placed on the inside of the doorway. For example, the user may place the markers 610a, 610b along a horizontal surface above the doorway and facing downward toward the floor surface so that the upward angled camera 109 can detect the markers 610a, 610b. The placement of the markers 610a, 610b adjacent the doorway 611 can establish the location of a virtual barrier and make sure that the robot 100 only cleans the first room 607 and does not enter the second room 608.

Along the path 604 at the point 604a, now also referring to FIG. 7B, the robot 100 detects the markers 610a, 610b on the wall surface 609 using the camera 109. The markers 610a, 610b include distinctive features or machine-readable information that can be sensed by the camera 109. Thus, some markers 610a, 610b can indicate the location of a virtual barrier while other markers can be used to relay other types of information to the robot 100. The machine-readable information or feature can represent a name of a location corresponding to the structure or obstacle in the environment. In some cases, the machine-readable information can represent a name of a location corresponding to the structure or obstacle in the environment. The feature or machine-readable information may be a color, image, or other characteristic that can be detected by the camera 109. And, in some implementations, the camera 109 may be responsive to radiation outside of the visible light range and therefore may also be able to detect, for example, infrared characteristics of the markers 610a, 610b. While the camera 109 has been described as the sensor to detect the markers 610a, 610b, in some implementations, the robot 100 may use other sensors to detect the markers 610a, 610b, such as ultrasonic, infrared, and other directional beam sensors.

The distinctive features may indicate attributes of the environment 602 and/or the wall surface 609. These features may be used for identification purposes in addition or as an alternative to establishing a virtual barrier. The memory storage element 395 can include a library of reference features to which the controller 390 can compare the imaged markers 610a, 610b. The controller 390 can then determine whether the markers 610a, 610b include features within the library of reference features.

In some examples, the features of the markers 610a, 610b may indicate that the environment 602 through which the robot 100 is navigating is a particular room, such as a kitchen, a bathroom, a bedroom, a living room, etc. For example, the markers 610a, 610b may include a refrigerator icon that indicates that the first room 607 is a kitchen, and a television icon that indicates that the second room is a living room. In some cases, the markers 610a, 610b may indicate a type of structure exists between the markers 610a, 610b. For example, in some cases, the markers 610a, 610b may indicate that the doorway 611 lies in between the markers 610a, 610b. In other cases, the markers 610a, 610b may be placed in the environment 602 such that the robot does not enter a difficult-to-clean area or an area with fragile furniture or household items. The markers 610a, 610b may be placed on lamps, furniture, or other household objects that can be imaged by the camera 109. For example, one type of marker could establish a keep-out zone of a predefined distance from the marker (e.g., 0.25 m to 0.5 m, 0.5 m to 1 m, 1 m to 1.5 m). The markers 610a, 610b can have a particular color for specific attributes, or a specific image for particular rooms. In some implementations, the markers 610a, 610b may include distinctive images to serve as the distinctive features of the markers 610a, 610b.

The distinctive features may also be names of the room that the markers 610a, 610b mark, names of the obstacles that the markers 610a, 610b mark, or names of the locations that the markers 610a, 610b mark. For example, in implementations where the robot 100 has maps generated from previous cleaning operations, the markers 610a, 610b may indicate that the robot 100 is in the kitchen, and the robot 100 may then use a map corresponding to the kitchen that was previously generated. In some cases, the robot 100 may not begin a cleaning operation until it detects the markers 610a, 610b. When the robot 100 detects the markers 610a, 610b, the robot 100 can begin a cleaning operation based on the information from the markers 610a, 610b. The information provided by the distinctive features may be transmitted to a mobile device so that a user can see the information and select operations of the robot 100 based on the information.

The controller can post-process the images generated of the markers 610a, 610b before identifying the markers 610a, 610b. For example, the controller may rectify the images using an affine transformation or some other computer vision process for image rectification. After transforming the images of the markers 610a, 610b, the controller can compare the images to stored reference images in, for example, the library of reference features on the memory storage element 395 of the robot 100 in order to confirm that the robot 100 has detected the markers 610a, 610b. The comparison can also allow the controller 390 to determine the type of information provided by the markers 610a, 610b (e.g., attributes of the environment 602 and the wall surface 609). In some implementations, the markers 610a, 610b each can have multiple portions conveying different types of information. One portion of each of the markers 610a, 610b can indicate the type of the first room 607 that the robot 100 is currently in, and another portion of each of the markers 610a, 610b can indicate the type of the second room 608 connected to the doorway 611.

In examples where the markers 610a, 610b are used to establish virtual barriers, upon detecting the markers 610a, 610b and confirming that the robot has detected the markers 610a, 610b, the robot 100 can designate a virtual barrier 612 (e.g., a set of non-traversable cells) in the occupancy grid 606 based on the positions of the markers 610a, 610b. For example, the controller can compute a line 614 that passes through both the marker 610a and the marker 610b. The line 614 is parallel to the virtual barrier 612 that the controller designates in the occupancy grid 606. While the virtual barrier 612 in the occupancy grid 606 is shown to be in between the markers 610a, 610b, in some implementations, the virtual barrier 612 generated from sensing the markers 610a, 610b may span a greater length than the line 614 that connects the markers 610a, 610b.

The markers 610a, 610b can indicate to the robot 100 that the doorway 611 exists in between the markers 610a, 610b. In such cases, upon finishing the cleaning operation of the first room 607, the robot 100 can, in a subsequent cleaning operation, move to the virtual barrier 612 and begin a subsequent cleaning operation to clean the second room 608. The virtual barrier 612 may persist, but, instead of cleaning the first room 607 on the right side of the virtual barrier 612, the robot 100 cleans the second room 608.

The robot 100 can continue to clean the first room 607 within the bounds of the virtual barrier 612 and the physical wall surface 609 until one or more conditions are met. The one or more conditions can include, for example, covering a percentage of the defined area and/or other conditions described herein.

In some implementations, the robot 100 may remember the virtual barrier 612 in a subsequent cleaning operation (e.g., in a persistent occupancy grid). The user may remove the markers 610a, 610b after the first cleaning operation when the robot 100 detects the markers 610a, 610b, and the virtual barrier 612 as part of the first cleaning operation persists. The robot 100, for example, stores the virtual barrier 612 and uses it for the subsequent cleaning operation. Upon starting the subsequent cleaning operation in the first room 607, the robot 100 remains in the first room 607 and does not proceed through the doorway 611 to the second room 608.

Figure 7C:
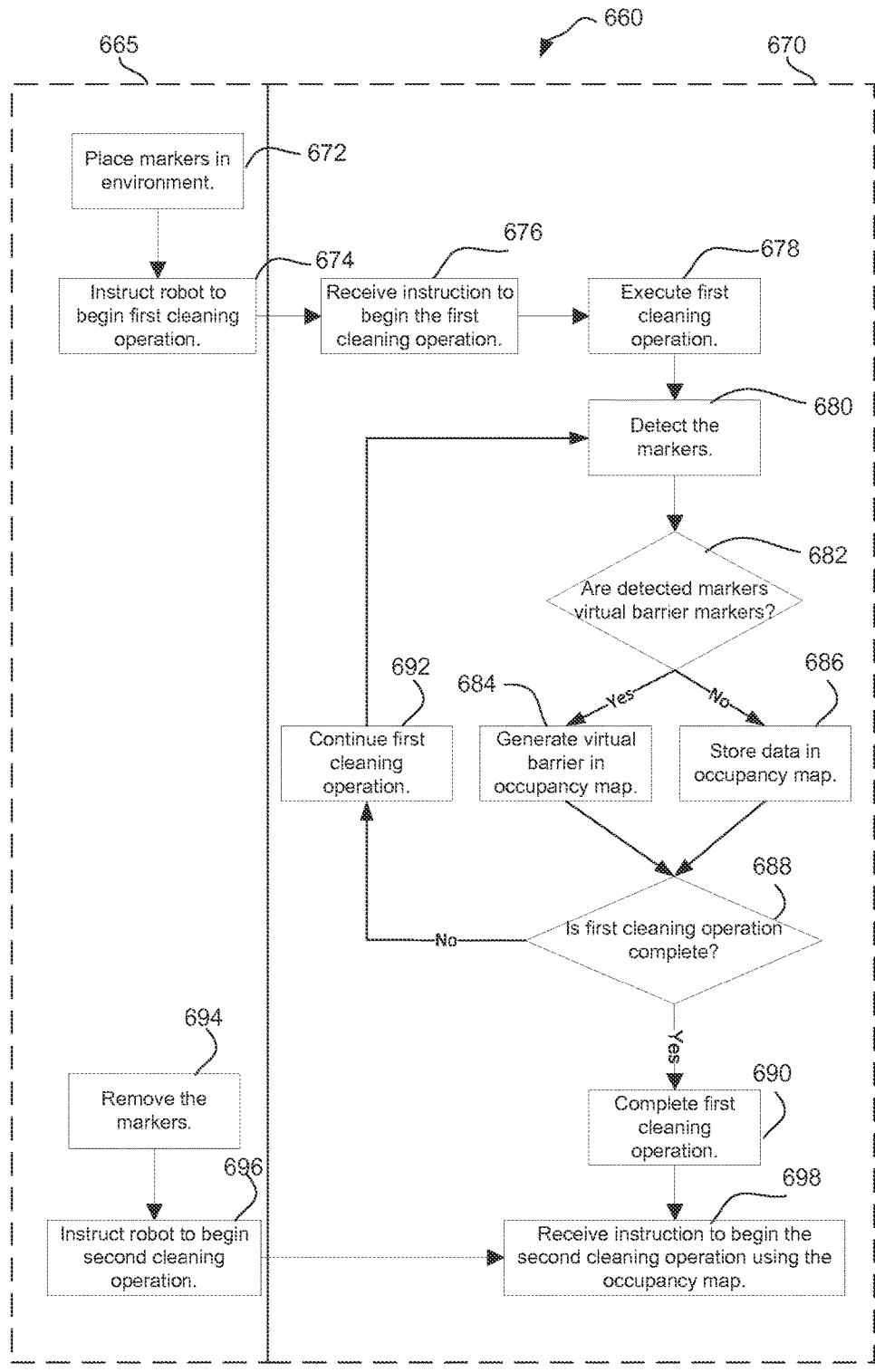

Referring to FIG. 7C, a flow chart 660 illustrates a method of using markers in an environment to instruct a robot to generate a virtual barrier in an occupancy grid stored on the robot. The flow chart 660 includes user operations 665 corresponding to operations executed by the user and robot operations 670 corresponding to operations executed by the robot.

At operation 672, the user places the markers in the environment. The user can place the markers such that they flank a specific feature in the environment the user does not want the user to traverse, such as a doorway, threshold, or other opening. The markers may be placed on a surface in the environment to identify a room item. The surface may be the surface of a wall, obstacle, or other object in the environment.

At operation 674, the user instructs the robot to begin a first cleaning operation. The user may use a mobile device or may depress a button on the robot to instruct the robot to begin the first cleaning operation.

At operation 676, a controller of the robot receives the instruction to begin the first cleaning operation. At operation 678, the robot executes the first cleaning operation. In some cases, the controller begins the first cleaning operation, by, for example, instructing the robot to begin the cleaning operation. During the cleaning operation, the robot may execute the cornrow pattern, as described herein, or some other movement pattern to cover a floor surface of the environment.

At operation 680, the robot detects the markers in the environment. The controller can use a camera, ultrasonic sensor, or some other sensor on the robot to detect the markers. In some cases, as described herein, the camera may detect a color, image, or other distinctive feature of the markers. The controller can receive image data from the camera corresponding to the detection of the markers.

At operation 682, the controller determines whether the detected markers are virtual barrier markers. The controller may also post-process the image data of the detected markers and make a determination of whether the image data correspond to reference images that the controller may expect from detecting the markers. The controller may compare the image data to reference images in a library stored on a memory storage element operable with the controller. The controller can determine whether the detected markers indicate a virtual barrier, a location, or other information about the environment.

If the controller determines that the detected markers are virtual barrier markers, at operation 684, the controller generates a virtual barrier in an occupancy grid that, for example, corresponds to the location of the detected markers. The virtual barrier, as described herein, can correspond to a set of non-traversable cells to be marked on the occupancy grid. In some cases, the length or width of the non-traversable barrier may depend on distinctive features detected on the markers. If the controller determines that the detected marker is not a virtual barrier marker, at operation 686, the controller stores data related to the detected marker in the occupancy grid. The data may be, for example, a name of the room, a name of the location of the detected markers. In some implementations, the controller may determine that the controller has misidentified the detected markers and that the detected markers do not indicate information about the environment. In some examples, the controller may determine that the detected markers indicate both a virtual barrier and data related to the name of the room or the location of the detected markers.

At operation 688, the controller determines whether the first cleaning operation is complete. The controller can evaluate whether the robot has met one or more conditions as described herein. If the controller determines that the first cleaning operation is complete, at operation 690, the robot completes the first cleaning operation. If the controller determines that the first cleaning operation is not complete, at operation 692, the robot continues the first cleaning operation. The controller can instruct the robot to continue the first cleaning operation. The robot can then continue to detect markers in the environment, or in some cases, the robot continues the first cleaning operation and then completes the first cleaning operation without detecting additional markers and proceeds to operation 690.

In some implementations, the controller may store the virtual barrier to be used in a subsequent cleaning operation. As a result, at operation 694, the user may remove the markers from the environment. In some implementations, the user may keep the markers in the environment, and subsequent detections of the markers by the camera of the robot can increase the confidence that the camera has detected the markers.

Then, at operation 696, the user can instruct the robot to begin a second cleaning operation. In some cases, the user instructs the robot to begin the second cleaning operation in the environment that the robot cleaned during the first cleaning operation. In other cases, the user instructs the robot to begin the cleaning operation in another environment. At operation 698, the controller receives the instruction to begin the second cleaning operation using the occupancy grid generated during the first cleaning operation. The controller then instructs the robot to begin the second cleaning operation. If the robot begins the second cleaning operation in the environment cleaned during operations 678 and 692, the robot cleans the same areas and does not cross the virtual barrier. If the robot begins the second cleaning operation in another environment, the robot can clean an area different than the area cleaned during the first cleaning operation, and the virtual barrier effectively prevents the robot from returning the area cleaned during operation 678 and 692.

While the examples illustrated in FIGS. 7A to 7C have been described with respect to robot 100 described in FIGS. 2A to 2B, other mobile robots having other appropriate configurations can implement the methods described herein. For example, the robot 200 can include a camera that can execute the functions described herein. In some implementations, the camera 109 can capture images that the controller can use to identify geometric features characteristic of doorways (e.g., a rectangular opening that extends from the floor through a portion of the wall). The controller can then place a virtual barrier corresponding to the location of the doorway geometry detected by the camera 109.

Figure 8A:
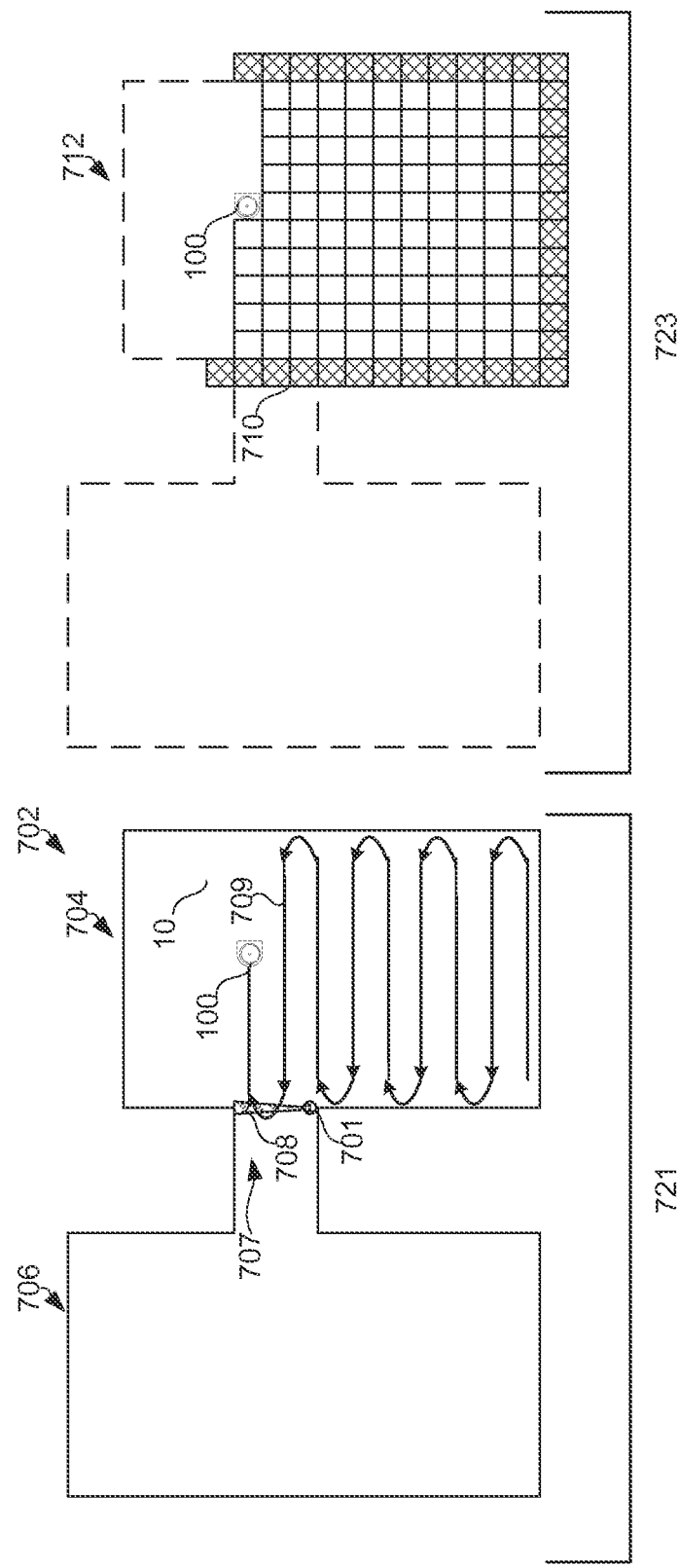

The robot 100, as described herein, includes the infrared transceiver 118 to detect infrared radiation emitted into the environment. Referring to FIG. 8A, a gateway beacon 701 is located on the floor surface 10 of an environment 702 including a first room 704 and a second room 706 (e.g., as shown in portion 721 of FIG. 8A). A doorway 707 separates the first room 704 from the second room 706. The gateway beacon 701 emits an infrared gateway beam 708 detectable by the infrared transceiver 118. A user can place the gateway beacon 701 in the environment 702 and can orient the gateway beacon 701 such that the gateway beam 708 points in a specific direction. For example, the gateway beam 708 can be directed across the length of the doorway 707.

While cleaning the first room 704, the robot 100 may execute a cornrow pattern in the form of a path 709. As the robot 100 navigates about the first room 704 along the path 709, the robot 100 may detect the gateway beam 708 as the robot 100 passes by the gateway beam 708 using, for example, the infrared transceiver 118. The robot 100 can detect the gateway beam 708 and interpret the locations where the robot 100 detects the gateway beam 708 as a virtual barrier 710 (e.g., a set of non-traversable cells) in an occupancy grid 712 of the robot 100 (e.g., as shown in portion 723 of FIG. 8A). Although FIG. 8A shows that the path 709 passes near the gateway beam 708, in other implementations, the path 709 may pass through the gateway beam 708. The gateway beacon 701 and its gateway beam 708 thus prevents the robot 100 from passing through the doorway 707.

Referring to FIG. 8B, the robot 100, in a subsequent cleaning operation, the robot 100 can store the location of the virtual barrier 710 in, for example, memory or on a remote computing device as part of a persistent map (e.g., as shown in the portion 723 of FIG. 8B). As a result, when the gateway beacon 701 placed in the environment 702 in FIG. 8A is removed from the environment for subsequent cleaning operations, the robot 100 can still prevent itself from crossing the virtual barrier 710. In some cases, the robot 100 can be placed in the first room 704 and re-clean the first room 704 without crossing the virtual barrier 710 into the second room 706. In other cases, the robot 100 can be placed in the second room 706 and can clean the second room 706 without cleaning the first room 704 again.

Figure 8C:
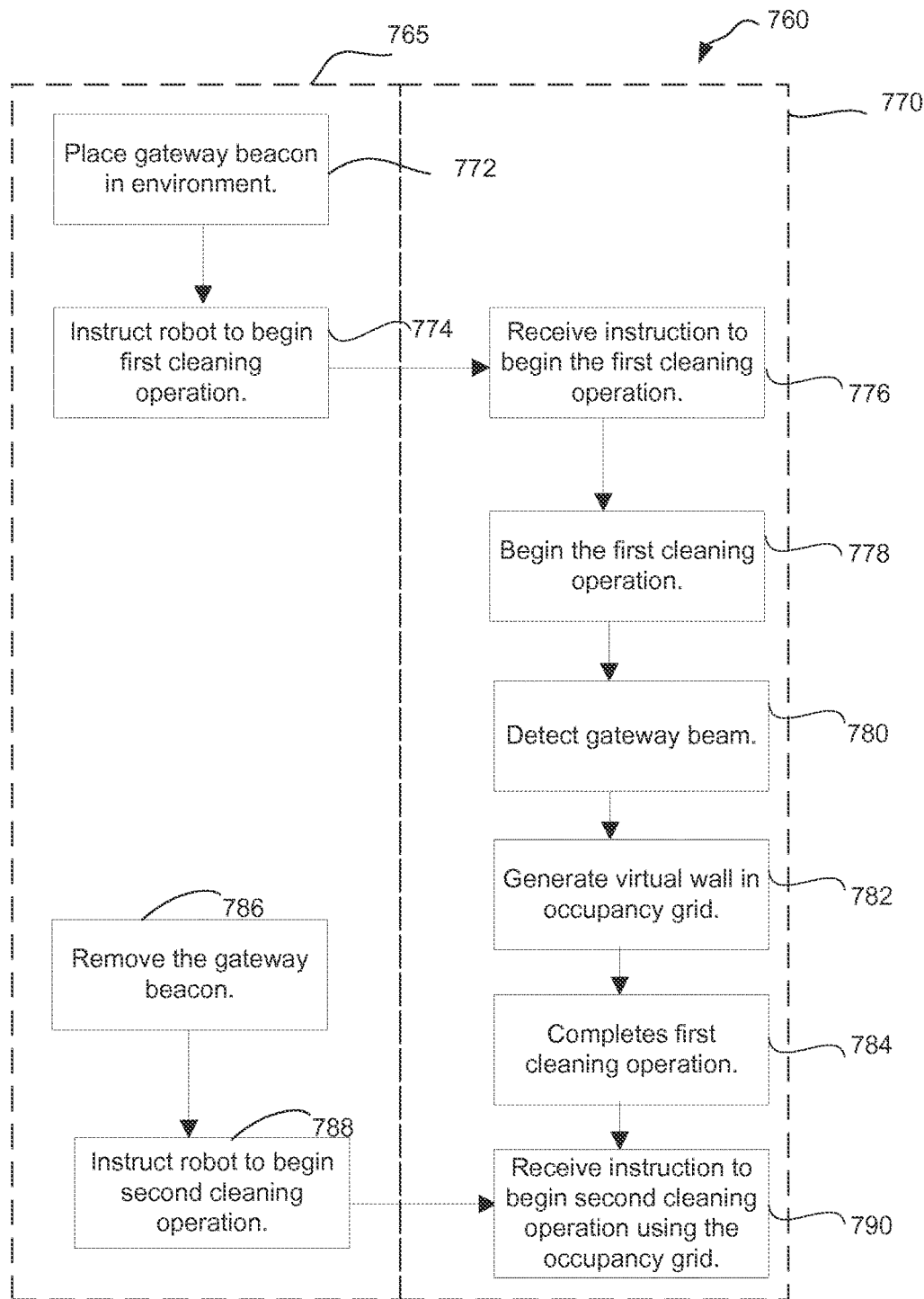

Referring to FIG. 8C, a flow chart 760 illustrates a method of using a gateway beacon in an environment to instruct a robot to generate a virtual barrier in an occupancy grid stored on the robot. The flow chart 760 includes user operations 765 corresponding to operations executed by the user and robot operations 770 corresponding to operations executed by the robot.

At operation 772, the user places the gateway beacon in the environment. The user can place the gateway beacon on the floor surface of the environment such that the gateway beam marks a specific feature or location in the environment that the user does not want the robot to traverse, such as a doorway, threshold, or other opening.

At operation 774, the user instructs the robot to begin a first cleaning operation. The user may use a mobile device or depress a button on the robot to instruct the robot to begin the first cleaning operation.

At operation 776, the controller of the robot receives the instruction to begin the first cleaning operation. At operation 778, the controller begins the first cleaning operation.

At operation 780, a transceiver of the robot detects the gateway beam in the environment. The transceiver can be an infrared transceiver.

At operation 782, the controller generates a virtual barrier in an occupancy grid or other persistent map. The virtual barrier, as described herein, can correspond to a line of non-traversable cells to be marked on the occupancy grid. In some implementations, the virtual barrier can be a set of coordinates that define a line or curve in an occupancy grid. In some cases, the length or width of the non-traversable barrier may depend on the strength of the signal that the robot senses as it detects the gateway beam in operation 780.

At operation 784, the controller completes the first cleaning operation. The controller can complete the first cleaning operation by, for example, determining that the robot has met one or more conditions such as, for example, covering a percentage of the defined area and/or fulfilling other conditions described herein.

In some implementations, the robot may store the virtual barrier in a persistent map to be used in a subsequent cleaning operation. As a result, at operation 786, the user may remove the gateway beacon from the environment.

Then, at operation 788, the user can instruct the robot to begin a second cleaning operation. In some cases, the user instructs the robot to begin the second cleaning operation in the environment that the robot cleaned during the first cleaning operation. In other cases, the user instructs the robot to begin the cleaning operation in another environment. At operation 790, the robot begins the second cleaning operation using the occupancy grid generated during the first cleaning operation. If the robot begins the second cleaning operation in the environment cleaned during operation 778, the robot generally cleans the same areas and does not cross the virtual barrier. If the robot begins the second cleaning operation in another environment, the robot can clean an area different than the area cleaned during the first cleaning operation, and the virtual barrier effectively prevents the robot from returning to the area cleaned during operation 778.

While the examples illustrated in FIGS. 8A to 8C have been described to use the robot 100 described in FIGS. 2A to 2B, other mobile robots having other appropriate configurations can implement the methods described herein. For example, the robot 200 can include an infrared transceiver that can execute the functions described herein.

While the virtual barriers generated herein have been described to be straight walls, in some implementations, the virtual barriers can be circular. For example, placing the robot into the handshake mode described with respect to FIGS. 6A to 6C can cause the controller to generate a substantially circular virtual barrier that can, for example, restrict a robot to a circular area rug. In some cases, the user can instruct the controller to generate a circular virtual barrier using a mobile computing device that can communicate with the communications system of the robot. In some cases, the robot may continue the cleaning operation in the circular area until the controller has determined that the robot has fulfilled one or more conditions, such as, for example, covering a percentage of the defined area and/or fulfilling other conditions described herein. In other examples, the virtual barrier can establish a circular keep out zone.

The controller may use the virtual barriers to divide an environment into two or more regions to be covered separately. For example, the virtual barrier may divide the environment into two regions, where one region corresponds to for example, a kitchen, bathroom, a carpet, etc., and a second region corresponds to a bedroom, a living room, hardwood floor, etc. The controller can instruct the robot to clean the first region in one cleaning operation and then clean the second region in a subsequent cleaning operation. In some cases, the controller can instruct the robot to clean one region in a deeper cleaning mode where the robot will repeat a cleaning operation multiple times in the region. In some implementations, the user can label the individual regions of the environment as particular rooms in a house, such as a kitchen, bedroom, or bathroom. As described herein, the controller can also detect features in the markers 610a, 610b that can allow the controller to associate labels with regions of the environment. The user can then use the mobile computing device to instruct the robot to clean a labeled region. The user can also instruct the robot to keep out of a labeled region while the robot cleans another labeled region.

While in at least some of the examples described herein, the virtual barriers were stored in an occupancy grid used by the robot for localization, the virtual barriers could be stored in other types of maps used by the robot for localization and navigation.

The system can be controlled or implemented, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment.

Actions associated with implementing all or part of the control mechanism described herein can be performed by one or more programmable processors executing one or more computer programs to perform the functions described herein. All or part of the control mechanism described herein can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A robot comprising:
   a body movable relative to a surface;
   one or more measurement devices within the body to output information indicative of an initial orientation of the robot at an initial location of the robot on the surface; and
   a controller within the body to determine the initial orientation based on the information, and to control movement of the robot within an area of the surface by, while the robot is at the initial location and in the initial orientation, defining a virtual barrier corresponding to a line that extends across a width of the robot and beyond a first lateral side and a second lateral side of the robot, an orientation of the line being based on the initial orientation of the robot and a location of the line being based on the initial location of the robot, and
   restricting movement of the robot beyond the barrier.

2. The robot of claim 1, wherein the barrier extends through a doorway, and the initial location of the robot is within the doorway.

3. The robot of claim 1, wherein:
   the robot comprises a front and a back;
   the line extends parallel to the back of the robot; and
   the controller is configured to move the robot within the area without crossing the barrier.

4. The robot of claim 1, wherein the line is tangential to a back of the robot.

5. The robot of claim 1, wherein the line is aligned with a visual indicator on the robot.

6. The robot of claim 1, wherein the line corresponds to a first line that extends parallel to a back of the robot, and the barrier is further defined by a second line that extends perpendicular to the back of the robot.

7. The robot of claim 6, wherein, while the robot is in the initial location and the initial orientation, the back of the robot is adjacent to the first line and a side of the robot is adjacent to the second line.

8. The robot of claim 6, wherein the controller is programmed to restrict movement of the robot beyond the barrier by controlling the robot to perform operations comprising:
   rotating at an angle relative to the initial orientation; and
   traversing the area along paths that are substantially parallel to the barrier.

9. The robot of claim 1, wherein defining the barrier comprises:
   generating a map that represents the area; and
   designating a representation of the barrier on the map when the robot is at the initial location, the representation of the barrier indicating a location that the robot is prohibited from crossing.

10. The robot of claim 9, wherein the representation of the barrier is designated by designating coordinates corresponding to the barrier as non-traversable.

11. The robot of claim 1, wherein the controller is programmed to determine the initial orientation of the robot and restrict the movement of the robot upon entry into a handshake mode, the controller being programmed to recognize the handshake mode in response to one or more user-initiated operations of the robot.

12. The robot of claim 1, further comprising a cleaning system configured to clean the surface during movement of the robot in the area.

13. The robot of claim 12, wherein the cleaning system includes a wet cleaning system configured to support a cleaning pad on a forward portion of the robot.

14. The robot of claim 1, further comprising a button operable to initiate a cleaning operation and to initiate defining of the barrier when the robot is positioned at the initial location.

15. The robot of claim 1, wherein the controller is configured to drive the robot across the surface in a coverage behavior to cover at least an interior portion of the area and in a wall following behavior to follow a perimeter of the area, the perimeter being defined at least in part by the initial orientation and the initial location.

16. The robot of claim 15, further comprising:
   a bumper movable relative to the body; and
   a sensor operable to produce a signal indicative of compression of the bumper relative to the body,
   wherein the controller is configured to initiate the wall following behavior based on the signal.

17. The robot of claim 15, wherein the controller is configured drive the robot in a cornrow pattern during the coverage behavior.

18. The robot of claim 15, wherein the controller is configured to initiate the wall following behavior after completion of the coverage behavior.

19. The robot of claim 1, further comprising indicator lights wherein the controller is configured to illuminate the indicator lights to indicate a reference line indicative of the location of the line.

20. The robot of claim 1, wherein:
the controller is configured to initiate autonomous movement of the robot across the surface, and
the barrier is defined before the autonomous movement of the body across the surface is initiated.

21. The robot of claim 9, wherein the controller is configured to transmit data indicative of the map and indicative of the representation of the barrier to a remote computing device to cause the remote computing device to display a representation of the map and the representation of the barrier.

22. The robot of claim 1, wherein the controller is configured to, while the robot is positioned at the initial location and at the initial orientation,
receive instructions to initiate defining the barrier, and
execute the instructions to define the barrier.

23. A robot comprising:
a body movable relative to a surface;
one or more measurement devices within the body to output information indicative of an initial orientation of the robot at an initial location of the robot on the surface; and
a controller within the body to determine the initial orientation based on the information, and to control movement of the robot within an area of the surface by defining a virtual barrier when the robot is positioned at the initial location, the barrier extending along a first line parallel to a back of the robot and being based on the initial orientation of the robot and the initial location of the robot,
illuminating a visual indicator of the robot aligned with a second line parallel to the first line, and
restricting movement of the robot beyond the barrier.

24. The robot of claim 23, wherein the controller is programmed to determine the initial orientation and restrict the movement of the robot upon entry into a handshake mode, the controller being programmed to recognize the handshake mode in response to one or more user-initiated operations of the robot.

25. The robot of claim 23, further comprising a cleaning system configured to clean the surface during movement of the robot in the area.

26. The robot of claim 25, wherein the cleaning system includes a wet cleaning system configured to support a cleaning pad on a forward portion of the robot.

27. The robot of claim 23, further comprising a button operable to initiate a cleaning operation and to initiate defining of the barrier when the robot is positioned at the initial location.

28. The robot of claim 23, wherein the controller is configured to, while the robot is positioned at the initial location and at the initial orientation,
receive instructions to initiate defining the barrier, and
execute the instructions to define the barrier.

* * * * *

UNITED STATES PATENT AND TRADEMARK OFFICE
CERTIFICATE OF CORRECTION

PATENT NO. : 9,868,211 B2
APPLICATION NO. : 14/682658
DATED : January 16, 2018
INVENTOR(S) : Marcus Williams et al.

It is certified that error appears in the above-identified patent and that said Letters Patent is hereby corrected as shown below:

In the Claims

Column 25, Line 8, in Claim 19, delete "lights" and insert -- lights, --, therefor.

Signed and Sealed this
Nineteenth Day of June, 2018

Andrei Iancu
*Director of the United States Patent and Trademark Office*